(12) United States Patent
Wang et al.

(10) Patent No.: US 11,581,785 B2
(45) Date of Patent: Feb. 14, 2023

(54) STATOR CORE, HOUSING, MOTOR COOLING SYSTEM OF ELECTRIC VEHICLE, AND ELECTRIC VEHICLE

(71) Applicant: Huawei Digital Power Technologies Co., Ltd., Shenzhen (CN)

(72) Inventors: Jiangang Wang, Dongguan (CN); Quanming Li, Dongguan (CN); Tingyu Xie, Dongguan (CN); Yibo Wang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/481,526

(22) Filed: Sep. 22, 2021

(65) Prior Publication Data

US 2022/0006354 A1  Jan. 6, 2022

Related U.S. Application Data

(63) Continuation of application No. PCT/CN2020/082845, filed on Apr. 1, 2020.

(30) Foreign Application Priority Data

Jun. 18, 2019 (CN) .......................... 201910528024.7

(51) Int. Cl.
*H02K 9/19* (2006.01)
*H02K 5/20* (2006.01)
(Continued)

(52) U.S. Cl.
CPC ................. *H02K 9/19* (2013.01); *B60K 1/00* (2013.01); *H02K 1/20* (2013.01); *H02K 5/203* (2021.01);
(Continued)

(58) Field of Classification Search
CPC ............... H02K 1/20; H02K 5/20; H02K 9/19
(Continued)

(56) References Cited

U.S. PATENT DOCUMENTS 6,943,473 B2 * 9/2005 Furuse ................... H02K 16/02
310/112
9,614,417 B2 * 4/2017 Lee .......................... H02K 9/19
(Continued)

FOREIGN PATENT DOCUMENTS

| CN | 101752958 A | 6/2010 |
| CN | 204858766 U | 12/2015 |

(Continued)

*Primary Examiner* — Quyen P Leung
*Assistant Examiner* — Minki Chang
(74) *Attorney, Agent, or Firm* — Rimon PC

(57) ABSTRACT

This application provides a motor cooling system of an electric vehicle. In the cooling system, a coil cooling oil passage includes a first oil outlet that is at an end portion of a stator core. A core cooling oil passage and the coil cooling oil passage are sequentially connected. In this case, cooling oil first enters the core cooling oil passage, and then enters the coil cooling oil passage. The core cooling oil passage extends in a circumferential direction of the stator core. The coil cooling oil passage extends in an axial direction of the stator core. A power apparatus drives the cooling oil to enter the core cooling oil passage from an oil inlet, flow through the core cooling oil passage, and enters the coil cooling oil passage from an oil through port. The cooling oil flows back to an oil return groove from the first oil outlet.

19 Claims, 9 Drawing Sheets

(51) Int. Cl.
*H02K 1/20* (2006.01)
*H02K 7/116* (2006.01)
*B60K 1/00* (2006.01)

(52) U.S. Cl.
CPC ........ *H02K 7/116* (2013.01); *B60K 2001/006* (2013.01)

(58) Field of Classification Search
USPC .......................................................... 310/54
See application file for complete search history.

(56) References Cited

U.S. PATENT DOCUMENTS

| | | | |
|---|---|---|---|
| 2011/0156508 A1 | 6/2011 | Minemura et al. | |
| 2012/0080964 A1* | 4/2012 | Bradfield | H02K 1/20 310/58 |
| 2012/0133222 A1 | 5/2012 | Han et al. | |
| 2017/0063182 A1* | 3/2017 | Heilman | H02K 1/20 |

FOREIGN PATENT DOCUMENTS

| | | |
|---|---|---|
| CN | 105356671 A | 2/2016 |
| CN | 206834870 U | 1/2018 |
| CN | 207117341 U | 3/2018 |
| CN | 109149805 A | 1/2019 |
| CN | 109756056 A | 5/2019 |
| CN | 110365138 A | 10/2019 |
| DE | 1068803 B | 11/1959 |
| JP | S54005012 U | 1/1979 |
| JP | H02104761 U | 8/1990 |
| JP | 2000050572 A | 2/2000 |
| JP | 2013126280 A | 6/2013 |
| JP | 2016144391 A | 8/2016 |
| JP | 2017093207 A | 5/2017 |
| JP | 5213002 B2 | 10/2017 |
| JP | 2018085842 A | 5/2018 |
| WO | 2017177321 A1 | 10/2017 |
| WO | 2018016267 A1 | 1/2018 |
| WO | 2018066076 A1 | 4/2018 |

* cited by examiner

STATOR CORE, HOUSING, MOTOR COOLING SYSTEM OF ELECTRIC VEHICLE, AND ELECTRIC VEHICLE

CROSS-REFERENCE TO RELATED APPLICATIONS

This application is a continuation of International Application No. PCT/CN2020/082845, filed on Apr. 1, 2020, which claims priority to Chinese Patent Application No. 201910528024.7, filed on Jun. 18, 2019. The disclosures of the aforementioned applications are hereby incorporated by reference in their entireties.

TECHNICAL FIELD

This application relates to the field of motor vehicle device technologies, and in particular, to a stator core, a housing, a motor cooling system of an electric vehicle, and an electric vehicle.

BACKGROUND

With the development of electric vehicles, there are increasing requirements for miniaturization of motors in their powertrains. Specifically, a power density of a motor needs to be increased from 5.7 kW/L at present to 50 kW/L. With the increase in the power density, improving heat dissipation efficiency of the motor becomes a technical problem that needs to be solved urgently.

In the current technology, a water-cooled heat dissipation technology is usually used to dissipate heat for a motor. However, a power density of the water-cooled heat dissipation is comparatively low, and cooling water cannot be directly in contact with a motor assembly because the cooling water has no insulation, resulting in a comparatively high thermal resistance of a water-cooled link. In addition, a water-cooling technology requires comparatively high structural precision of motor components. To overcome the foregoing problems, an oil-cooled heat dissipation technology may be used to dissipate heat for the motor. In the oil-cooled heat dissipation technology used in the current technology, a flow passage for heat dissipation of a stator core and an end portion of a stator coil that are of the motor is in a parallel processing manner. To be specific, one part of cooling oil pumped by an oil pump is used to dissipate heat for the stator core, and one part of the cooling oil pumped by the oil pump is used to dissipate heat for the end portion of the stator coil, resulting in comparatively small flow amounts of both parts of the cooling oil and a comparatively poor cooling effect. In addition, in the current technology, the cooling oil is usually pumped to a comparatively high position by using the oil pump, and the cooling oil flowing out of an oil outlet flows down by gravity, which easily causes uneven oil amount distribution. Cooling effects in different areas are different, which easily leads to local overheating.

SUMMARY

This application provides a stator core, a housing, a motor cooling system of an electric vehicle, and an electric vehicle, to increase an oil flow amount of a motor cooling passage of the electric vehicle, and improve cooling efficiency of the cooling system.

According to a first aspect, this application provides a stator core, where the stator core is a barrel-shaped stator core, and includes a first segment, a third segment, a second segment, and a fourth segment that are sequentially connected in a circumferential direction, where the first segment and the second segment are disposed oppositely, and the third segment and the fourth segment are separately connected between the first segment and the second segment. An outer wall of the first segment includes a coil cooling oil passage groove. The coil cooling oil passage groove extends in an axial direction of the stator core and passes through the stator core, so that cooling oil may flow out of two ends of the stator core to cool end portions of the stator core. An outer wall of the second segment includes an oil return groove. The oil return groove also extends in the axial direction of the stator core and passes through the stator core, so that the cooling oil flowing into the oil return groove can be collected for recycling. An outer wall of the third segment includes a core cooling oil passage groove. The core cooling oil passage groove extends in a circumferential direction of the stator core. There is an oil inlet area at an end that is of the core cooling oil passage groove and that is close to the second segment, the oil inlet area is opposite to an oil inlet. There is an oil through port at an end that is of the core cooling oil passage groove and that is close to the first segment. The core cooling oil passage groove is connected to the coil cooling oil passage groove through the oil through port, so that the cooling oil may flow from the core cooling oil passage groove to the coil cooling oil passage groove. In a first direction, a distance between the oil inlet area and the oil return groove is less than a distance between the oil through port and the oil return groove, where the first direction is a gravity direction existing when a cooling system is in use. In other words, when a motor cooling system is in use, the oil inlet is closer to the oil return groove than the oil through port, and the oil return groove is located at a low position of the cooling system. An outer wall of the fourth segment also includes a core cooling oil passage groove. The core cooling oil passage groove extends in the circumferential direction of the stator core. There is an oil inlet area at an end that is of the core cooling oil passage groove and that is close to the second segment, and the oil inlet area is opposite to the oil inlet. There is the oil through port at an end that is of the core cooling oil passage groove and that is close to the first segment. The core cooling oil passage groove is connected to the coil cooling oil passage groove through the oil through port, so that the cooling oil may flow from the core cooling oil passage groove to the coil cooling oil passage groove. In this embodiment, the cooling oil flowing through the two core cooling oil passage grooves both enters the coil cooling oil passage groove, so that an amount of cooling oil entering a coil cooling oil passage can be increased and a cooling effect can be improved.

Therefore, in the cooling system including the stator core, the stator core is mounted in a housing, so that an inner wall of the housing and an outer wall of the stator core fit together to form a core cooling oil passage and the coil cooling oil passage. The cooling oil enters the core cooling oil passage from the oil inlet, then flows upward along the core cooling oil passage to the oil through port under driving of a power apparatus, enters the coil cooling oil passage, then is discharged from a first oil outlet of the coil cooling oil passage, and falls back to the oil return groove, to facilitate a next cooling cycle. In the cooling system, there are larger oil flow amounts of cooling oil in both the core cooling oil passage and the coil cooling oil passage. Therefore, the cooling system has a higher heat transfer coefficient and higher cooling efficiency.

In another technical solution, the outer wall of the fourth segment includes a core oil return passage groove. An end that is of the core oil return passage groove and that is close to the second segment is connected to the oil return groove, and an end that is of the core oil return passage groove and that is close to the first segment is connected to the coil cooling oil passage groove. In this technical solution, the core oil return passage groove and the core cooling oil passage groove are located on two sides of the oil return groove. The cooling oil enters the core cooling oil passage groove from the oil inlet, flows along the core cooling oil passage groove to the coil cooling oil passage groove, and then flows to the core oil return passage groove. The cooling oil that enters the core oil return passage groove flows back to the oil return groove for cycling. In this embodiment, only one oil inlet may be disposed, which achieves a comparatively simple structure. In addition, all the cooling oil first enters the core cooling oil passage groove, and a part of the oil may enter the core oil return passage groove, so that there is a larger amount of cooling oil for cooling the stator core. Therefore, a cooling effect on the stator core can be improved.

In a specific technical solution, the stator core is interference-fitted in a barrel-shaped inner cavity of the housing, so that the inner wall of the housing wraps around the outer wall of the stator core. In addition, the inner wall of the housing is closed with the coil cooling oil passage groove, the oil return groove, and the core cooling oil passage grooves that are on the outer wall of the stator core, and closely covers openings of the foregoing grooves, to form the coil cooling oil passage, an oil return passage, and the core cooling oil passage. In this embodiment, the motor cooling system requires only that grooves be made on the outer wall of the stator core, and a manufacturing process is comparatively simple. In addition, larger rigidity of the stator core brings more stability to a structure of the core cooling oil passage. In this embodiment, the cooling oil may also be in direct contact with the stator core, achieving a better cooling effect.

In an optional technical solution, on a section that is of the stator core and that passes through the oil inlet area, where the section is perpendicular to the axial direction of the stator core, a circumferential distance $L_1$ between an axis of the oil return groove and the oil inlet area, and an outer circumference L of the stator core meet: $L_1 \leq \frac{1}{8}L$. In this technical solution, the oil inlet of the core cooling oil passage is close to the oil return groove, and the oil return groove is located at the bottom of the cooling system when in use. Therefore, the oil inlet is located at the bottom of the cooling system and is close to the oil return groove, so that the cooling oil enters the cooling system from the bottom of the cooling system, and runs upward to the oil through port. In this way, there is a longer cooling path for the stator core, which helps improve cooling efficiency.

In another optional technical solution, on a section that is of the stator core and that passes through the oil through port, where the section is perpendicular to the axial direction of the stator core, a circumferential distance $L_2$ between the axis of the oil return groove and the oil through port, and the outer circumference L of the stator core meet: $L_2 \geq \frac{3}{8}L$. In this technical solution, the oil through port of the core cooling oil passage is far away from the oil return groove, and the oil return groove is located at the bottom of the cooling system when in use. Therefore, the oil through port is located at the top of the cooling system. The cooling oil enters the cooling system from the bottom of the cooling system, and runs upward to the oil through port at the top with power provided by the power apparatus. In this way, there is a longer running path, which achieves a better heat dissipation effect on the stator core.

In still another optional technical solution, along the section perpendicular to the axial direction of the stator core, a total circumferential length $L_3$ of projections of the core cooling oil passage grooves and the outer circumference L of the stator core meet: $L_3 \geq \frac{9}{10}L$. In this technical solution, the core cooling oil passage covers at least nine tenths of an area on a circumferential side of the stator core, thereby achieving a better heat dissipation effect on the stator core.

In an optional technical solution, along the section perpendicular to the axial direction of the stator core, an axis of the coil cooling oil passage groove is located at a highest position of the stator core in the first direction. In this technical solution, the core cooling oil passage grooves may be disposed on two sides of the coil cooling oil passage groove, and path lengths of the core cooling oil passage grooves disposed on the two sides are comparatively close, so that uniformity of stator core cooling can be increased.

According to a second aspect, this application provides a housing, where the housing has a barrel-shaped inner cavity, a barrel-shaped stator core is mounted in the barrel-shaped inner cavity, and the housing includes a first portion, a third portion, a second portion, and a fourth portion that are sequentially connected in a circumferential direction, where the first portion and the second portion are disposed oppositely, and the third portion and the fourth portion are separately connected between the first portion and the second portion. An outer wall of the first portion includes a coil cooling oil passage groove. The coil cooling oil passage groove extends in an axial direction of the barrel-shaped inner cavity, so that cooling oil may flow out of two ends of the stator core to cool end portions of the stator core. An inner wall of the second portion includes an oil return groove. The oil return groove also extends in an axial direction of the stator core and passes through the stator core, so that the cooling oil flowing into the oil return groove can be collected for recycling. An inner wall of the third portion includes a core cooling oil passage groove. The core cooling oil passage groove extends in a circumferential direction of the stator core. There is an oil inlet at an end that is of the core cooling oil passage groove and that is close to the second portion. There is an oil through port at an end that is of the core cooling oil passage groove and that is close to the first portion. The core cooling oil passage groove is connected to the coil cooling oil passage groove through the oil through port, so that the cooling oil may flow from the core cooling oil passage groove to the coil cooling oil passage groove. In a first direction, a distance between an oil inlet area and the oil return groove is less than a distance between the oil through port and the oil return groove, where the first direction is a gravity direction existing when a cooling system is in use. In other words, when a motor cooling system is in use, the oil inlet is closer to the oil return groove than the oil through port, and the oil return groove is located at a low position of the cooling system. An inner wall of the fourth portion also includes a core cooling oil passage groove. The core cooling oil passage groove extends in the circumferential direction of the stator core. There is an oil inlet area at an end that is of the core cooling oil passage groove and that is close to the second portion, and the oil inlet area is opposite to the oil inlet. There is the oil through port at an end that is of the core cooling oil passage groove and that is close to the first portion. The core cooling oil passage groove is connected to the coil cooling oil passage groove through the oil through port, so that the cooling oil may flow from the core cooling oil passage groove to the coil cooling oil passage groove. In this embodiment, the cooling oil flowing through the two core cooling oil passage grooves both enters the coil cooling oil passage groove, so that an amount of cooling oil entering a coil cooling oil passage can be increased and a cooling effect can be improved.

Therefore, in the cooling system including the housing, the stator core is mounted in the housing, so that an inner wall of the housing and an outer wall of the stator core fit together to form a core cooling oil passage and the coil cooling oil passage. The cooling oil enters the core cooling oil passage from the oil inlet, then flows upward along the core cooling oil passage to the oil through port under driving of a power apparatus, enters the coil cooling oil passage, then is discharged from a first oil outlet of the coil cooling oil passage, and falls back to the oil return groove, to facilitate a next cooling cycle. In the cooling system, there are larger oil flow amounts of cooling oil in both the core cooling oil passage and the coil cooling oil passage. Therefore, the cooling system has a higher heat transfer coefficient and higher cooling efficiency.

In another technical solution, the inner wall of the fourth portion includes a core oil return passage groove. An end that is of the core oil return passage groove and that is close to the second portion is connected to the oil return groove, and an end that is of the core oil return passage groove and that is close to the first portion is connected to the coil cooling oil passage groove. In this technical solution, the core oil return passage groove and the core cooling oil passage groove are located on two sides of the oil return groove. The cooling oil enters the core cooling oil passage groove from the oil inlet, flows along the core cooling oil passage groove to the coil cooling oil passage groove, and then flows to the core oil return passage groove. The cooling oil that enters the core oil return passage groove flows back to the oil return groove for cycling. In this embodiment, only one oil inlet may be disposed, which achieves a comparatively simple structure. In addition, all the cooling oil first enters the core cooling oil passage groove, and a part of the oil may enter the core oil return passage groove, so that there is a larger amount of cooling oil for cooling the stator core. Therefore, a cooling effect on the stator core can be improved.

In a specific embodiment, the stator core is interference-fitted in the barrel-shaped inner cavity of the housing, so that the inner wall of the housing wraps around the outer wall of the stator core. In addition, the outer wall of the stator core is closed with the coil cooling oil passage groove, the oil return groove, and the core cooling oil passage grooves that are on the inner wall of the housing, and closely covers openings of the foregoing grooves, to form the coil cooling oil passage, an oil return passage, and the core cooling oil passage. In this embodiment, the motor cooling system requires only that grooves be made on the inner wall of the housing, and a manufacturing process is comparatively simple. In addition, larger rigidity of the housing brings more stability to a structure of the core cooling oil passage. In this embodiment, the cooling oil may also be in direct contact with the stator core, achieving a better cooling effect.

In an optional technical solution, on a section that is of the barrel-shaped inner cavity and that passes through the oil inlet, where the section is perpendicular to the axial direction of the barrel-shaped inner cavity, a circumferential distance $L_1$ between an axis of the oil return groove and the oil inlet, and an inner circumference L of the barrel-shaped inner cavity meet: $L_1 \leq \frac{1}{8}L$. In this technical solution, the oil inlet of the core cooling oil passage is close to the oil return groove, and the oil return groove is located at the bottom of the cooling system when in use. Therefore, the oil inlet is located at the bottom of the cooling system and is close to the oil return groove, so that the cooling oil enters the cooling system from the bottom of the cooling system, and runs upward to the oil through port. In this way, there is a longer cooling path for the stator core, which helps improve cooling efficiency.

In another optional technical solution, on a section that is of the barrel-shaped inner cavity and that passes through the oil through port, where the section is perpendicular to the axial direction of the barrel-shaped inner cavity, a circumferential distance $L_2$ between the axis of the oil return groove and the oil through port, and the inner circumference L of the barrel-shaped inner cavity meet: $L_2 \geq \frac{3}{8}L$. In this technical solution, the oil through port of the core cooling oil passage is far away from the oil return groove, and the oil return groove is located at the bottom of the cooling system when in use. Therefore, the oil through port is located at the top of the cooling system. The cooling oil enters the cooling system from the bottom of the cooling system, and runs upward to the oil through port at the top with power provided by the power apparatus. In this way, there is a longer running path, which achieves a better heat dissipation effect on the stator core.

In still another optional technical solution, along the section perpendicular to the axial direction of the barrel-shaped inner cavity, a total circumferential length $L_3$ of projections of the core cooling oil passage grooves and the inner circumference L of the stator core meet: $L_3 \geq \frac{9}{10}L$. In this technical solution, the core cooling oil passage grooves cover at least nine tenths of an area on a circumferential side of the stator core, thereby achieving a better heat dissipation effect on the stator core.

In an optional technical solution, along the section perpendicular to the axial direction of the barrel-shaped inner cavity, an axis of the coil cooling oil passage groove is located at a highest position of the stator core in the first direction. In this technical solution, the core cooling oil passage grooves may be disposed on two sides of the coil cooling oil passage groove, and path lengths of the core cooling oil passage grooves disposed on the two sides are comparatively close, so that uniformity of stator core cooling can be increased.

According to a third aspect, this application provides a motor cooling system of an electric vehicle. The cooling system includes the stator core in the first aspect, where an outer wall of the stator core includes grooves, and the cooling system further includes a housing and a stator coil, where the stator core is mounted in the housing. A coil cooling oil passage groove, an oil return groove, core cooling oil passage grooves, and a core oil return passage groove that are on the outer wall of the stator core and an inner wall of the housing fit together to form a coil cooling oil passage, an oil return passage, a core cooling oil passage, and a core oil return passage. The stator coil is mounted to the stator core. Specifically, the stator core includes a plurality of tooth portions extending in an axial direction of the stator core. The tooth portions are distributed at intervals, a groove portion is formed between two adjacent tooth portions, and the stator coil is disposed around the tooth portions. The stator coil is in the axial direction of the stator core, and an end portion of the stator coil protrudes from the stator core. In this case, cooling oil flowing out of a first oil outlet located in the coil cooling oil passage may spray to the end portion of the stator coil, to cool the stator coil.

Specifically, driven by a power apparatus, the cooling oil first enters the core cooling oil passage from an oil inlet, and then enters the coil cooling oil passage through an oil through port. There are larger flow amounts of cooling oil in both the core cooling oil passage and the stator cooling oil passage. The cooling oil can be fully utilized to cool the stator core and the stator coil. Therefore, the cooling system has a higher heat transfer coefficient, and a motor achieves higher heat dissipation efficiency. The cooling oil enters the core cooling oil passage from the oil inlet, then flows upward along the core cooling oil passage to the oil through port, enters the coil cooling oil passage, and then is discharged from the first oil outlet. The cooling oil falls back to the oil return groove after cooling the end portion of the stator coil, to facilitate a next cooling cycle. The cooling system first cools the stator core and then cools the end portion of the stator coil, so that there are larger oil flow amounts of cooling oil to cool both the stator and the end portion of the coil. Therefore, the cooling system has a higher heat transfer coefficient and higher cooling efficiency.

In a further technical solution, the first oil outlet of the coil cooling oil passage is higher than the end portion of the stator coil in a first direction. In other words, when the cooling system is in use, the cooling oil flowing out of the first oil outlet may directly flow through end portions of the stator core under action of gravity, thereby cooling the stator core and simplifying a structure of the cooling system.

In a further technical solution, the cooling system further includes a reducer main body and a reducer oil passage. The reducer oil passage may be connected to the core cooling oil passage, or may be connected to the coil cooling oil passage. The reducer oil passage includes a second oil outlet. Therefore, after cooling the stator core, the cooling oil can be used to spray to an operation area of a rotating member of the reducer main body. Specifically, the operation area of the rotating member includes an area in which a bearing is located and a gear meshing portion. Therefore, cooling and lubrication of the bearing and the gear meshing portion that are of the reducer main body are implemented. In this technical solution, there is no need to separately dispose an oil loop for the reducer main body, which can simplify the structure of the cooling system, and in addition, improve utilization of the cooling oil in the cooling system.

In a further technical solution, the reducer oil passage includes a bending portion, and the bending portion is located in a cavity inside the housing. The bending portion includes a plurality of second oil outlets, and the bending portion may be bent according to a structure layout of the reducer main body, so that an operation area of each rotating member is opposite to at least one second oil outlet. In this way, the cooling oil from the second oil outlet can spray directly toward the gear meshing portion or a rotating portion of the bearing, to improve a spray effect and improve cooling and lubrication, performed by the cooling system, of the operation area of the rotating member in the reducer main body.

In a further technical solution, the cooling system further includes an oil-cooled heat exchanger. The oil-cooled heat exchanger is connected to the oil return groove, so that the cooling oil that flows back to the oil return groove can enter the oil-cooled heat exchanger for cooling. In this way, the cooling oil is kept at a comparatively low temperature, and a cooling effect of the cooling system is improved.

In a further technical solution, the cooling system further includes a filter. The filter is connected to the oil return groove, so that the cooling oil that flows back to the oil return groove can enter the filter for filtering. In this way, the cooling oil is kept in a comparatively clean state. It helps keep parts and components of a motor main body and parts and components of the reducer main body clean, and reduce oil passage blockage, thereby helping maintain the cooling effect of the cooling system.

In a further technical solution, the oil-cooled heat exchanger and the filter are integrated as an integral structure, so that integration of the cooling system can be improved, and smaller space is occupied.

In an optional technical solution of this application, the cooling system further includes an oil inlet passage. The oil inlet passage is connected to the core cooling oil passage, so that the cooling oil enters the core cooling oil passage through the oil inlet passage. The oil inlet passage is parallel to the oil return groove. This structure can improve structural integration of the cooling system.

In a further technical solution of this application, the cooling system further includes an oil guide groove. The oil guide groove guides a part of the cooling oil that sprays to the end portion of the stator coil to a bearing of the motor main body, to cool and lubricate the bearing, thereby improving an operation effect of the bearing.

According to a fourth aspect, this application provides another motor cooling system of an electric vehicle. The cooling system includes the housing in the second aspect, where an inner wall of the housing includes grooves, and the cooling system further includes a stator core and a stator coil, where the stator core is mounted in the housing. A coil cooling oil passage groove, an oil return groove, core cooling oil passage grooves, and a core oil return passage groove that are on the inner wall of the housing and an outer wall of the stator core fit together to form a coil cooling oil passage, an oil return passage, a core cooling oil passage, and a core oil return passage. The stator coil is mounted to the stator core. Specifically, the stator core includes a plurality of tooth portions extending in an axial direction of the stator core. The tooth portions are distributed at intervals, a groove portion is formed between two adjacent tooth portions, and the stator coil is disposed around the tooth portions. The stator coil is in the axial direction of the stator core, and an end portion of the stator coil protrudes from the stator core. In this case, cooling oil flowing out of a first oil outlet located in the coil cooling oil passage may spray to the end portion of the stator coil, to cool the stator coil. Specifically, driven by a power apparatus, the cooling oil first enters the core cooling oil passage from an oil inlet, and then enters the coil cooling oil passage through an oil through port. There are larger flow amounts of cooling oil in both the core cooling oil passage and the stator cooling oil passage. The cooling oil can be fully utilized to cool the stator core and the stator coil. Therefore, the cooling system has a higher heat transfer coefficient, and a motor achieves higher heat dissipation efficiency. The cooling oil enters the core cooling oil passage from the oil inlet, then flows upward along the core cooling oil passage to the oil through port, enters the coil cooling oil passage, and then is discharged from the first oil outlet. The cooling oil falls back to the oil return groove after cooling the end portion of the stator coil, to facilitate a next cooling cycle. The cooling system first cools the stator core and then cools the end portion of the stator coil, so that there are larger oil flow amounts of cooling oil to cool both the stator and the end portion of the coil. Therefore, the cooling system has a higher heat transfer coefficient and higher cooling efficiency.

According to a fifth aspect, this application provides another motor cooling system of an electric vehicle. The cooling system includes the stator core in the first aspect and the housing in the second aspect. To be specific, an outer wall of the stator core includes grooves, and an inner wall of the housing also includes grooves. Specifically, the grooves on the outer wall of the stator core may be opposite to the grooves on the inner wall of the housing, or the grooves on the outer wall of the stator core and the grooves on the inner wall of the housing may be staggered. The cooling system further includes a stator coil. The stator core is mounted in the housing to form a coil cooling oil passage, an oil return passage, a core cooling oil passage, and a core oil return passage. The stator coil is mounted to the stator core. Specifically, the stator core includes a plurality of tooth portions extending in an axial direction of the stator core. The tooth portions are distributed at intervals, a groove portion is formed between two adjacent tooth portions, and the stator coil is disposed around the tooth portions. The stator coil is in the axial direction of the stator core, and an end portion of the stator coil protrudes from the stator core. In this case, cooling oil flowing out of a first oil outlet located in the coil cooling oil passage may spray to the end portion of the stator coil, to cool the stator coil. Specifically, driven by a power apparatus, the cooling oil first enters the core cooling oil passage from an oil inlet, and then enters the coil cooling oil passage through an oil through port. There are larger flow amounts of cooling oil in both the core cooling oil passage and the stator cooling oil passage. The cooling oil can be fully utilized to cool the stator core and the stator coil. Therefore, the cooling system has a higher heat transfer coefficient, and a motor achieves higher heat dissipation efficiency. The cooling oil enters the core cooling oil passage from the oil inlet, then flows upward along the core cooling oil passage to the oil through port, enters the coil cooling oil passage, and then is discharged from the first oil outlet. The cooling oil falls back to the oil return groove after cooling the end portion of the stator coil, to facilitate a next cooling cycle. The cooling system first cools the stator core and then cools the end portion of the stator coil, so that there are larger oil flow amounts of cooling oil to cool both the stator and the end portion of the coil. Therefore, the cooling system has a higher heat transfer coefficient and higher cooling efficiency.

According to a sixth aspect, this application provides an electric vehicle. The electric vehicle includes the motor cooling system in any one of the foregoing technical solutions. The electric vehicle includes a motor and a battery. The battery is electrically connected to the motor to drive the motor to run. When the motor runs, the electric vehicle can be driven to run. The stator core in the foregoing motor cooling system belongs to the motor of the electric vehicle, and cooling of the stator core performed by the motor cooling system is cooling of the motor of the electric vehicle. Therefore, a better cooling effect on the motor of the electric vehicle is achieved, which helps improve movement efficiency of the electric vehicle and prolong service life of the electric vehicle.

Figure 1:
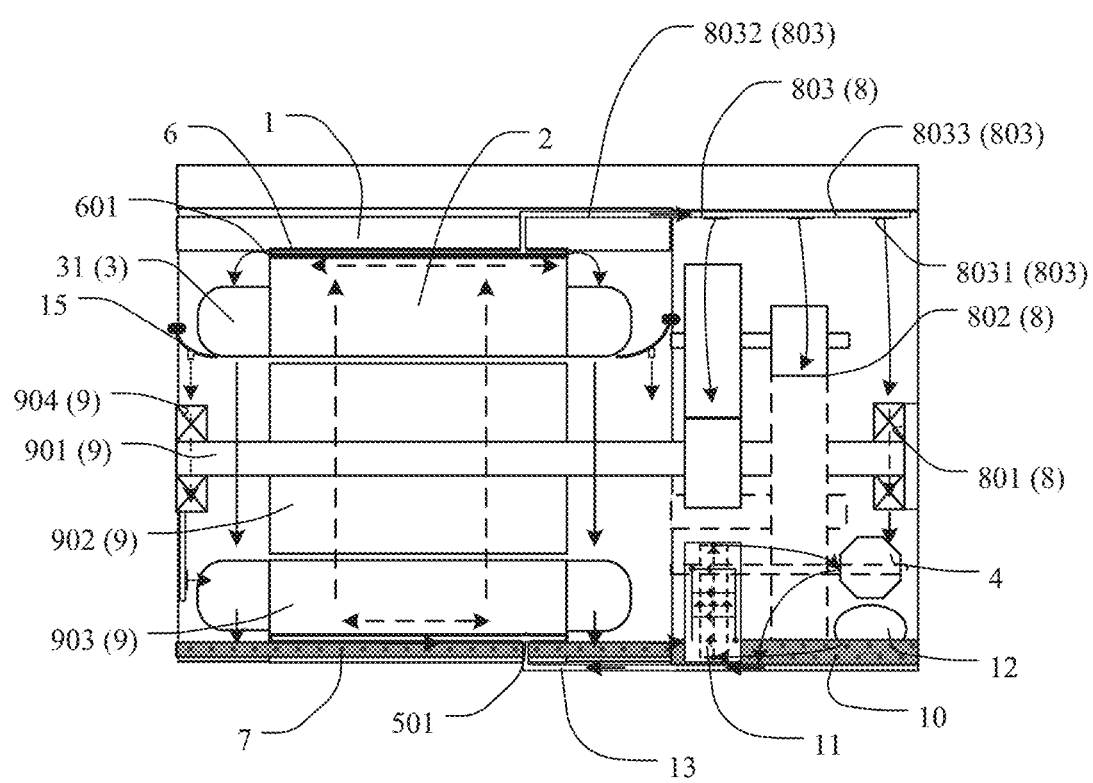
FIG. 1 is a schematic diagram of a flow path of cooling oil in a cooling system according to an embodiment of this application.

Reference signs in the accompanying drawings:
1: housing; 11: first portion;
111: coil cooling oil passage groove; 12: second portion;
121: oil return groove; 13: third portion;
131: core cooling oil passage groove; 14: fourth portion;
141: core cooling oil passage groove; 142: core oil return passage groove;
2: stator core; 21: first segment;
211: coil cooling oil passage groove; 22: second segment;
221: oil return groove; 23: third segment;
231: core cooling oil passage groove; 2311: oil inlet area;
24: fourth segment; 241: core cooling oil passage groove;
2411: oil inlet area; 242: core oil return passage groove;
3: stator coil; 31: end portion of the stator coil;
4: power apparatus; 5: core cooling oil passage;
5': core oil return passage; 501: oil inlet;
502: oil through port; 503: first oil passage;
504: second oil passage; 6: coil cooling oil passage;
601: first oil outlet; 7: oil return passage;
8: reducer main body; 801: bearing;
802: gear meshing portion; 803: reducer oil passage;
8031: second oil outlet; 8032: first oil passage portion;
8033: bending portion; 9: motor main body;
901: rotating shaft; 902: rotor;
903: stator; 904: bearing of the motor main body;
10: oil pool; 11: oil-cooled heat exchanger;
12: filter; 13: oil inlet passage;
14: oil inlet pipe; 141: oil inlet pipe branch; and
15: oil guide groove.

DESCRIPTION OF EMBODIMENTS

To make the objectives, technical solutions, and advantages of this application clearer, the following further describes this application in detail with reference to the accompanying drawings.

Terms used in the following embodiments are merely for the purpose of describing specific embodiments, but are not intended to limit this application. As used in the specification and appended claims of this application, the singular expressions "one", "a", "the", "the above", "the" and "this" are intended to also include expressions such as "one or more", unless it is expressly indicated to the contrary in its context.

Reference to "an embodiment", "some embodiments", or the like described in this specification means that one or more embodiments of this application include a specific feature, structure, or characteristic described with reference to the one or more embodiments. Therefore, phrases "in an embodiment", "in some embodiments", "in some other embodiments", "in some other embodiments", and the like that appear in different places in this specification do not necessarily all mean referring to a same embodiment, but rather mean "one or more but not all embodiments", unless otherwise specifically emphasized in another manner. Terms "include", "comprise", "have", and variations thereof all mean "including but not limited to", unless otherwise specifically emphasized in another manner.

For ease of understanding of a stator core, a housing, a motor cooling system of an electric vehicle, and an electric vehicle that are provided in the embodiments of this application, the following describes application scenarios of the stator core, the housing, the motor cooling system of the electric vehicle, and the electric vehicle. The motor cooling system of the electric vehicle can dissipate heat generated by a motor of the electric vehicle. A large amount of heat is generated in an operation process of the motor. Therefore, an important measure for ensuring stable operation and longer service life of the motor is to maintain effective heat dissipation. Therefore, this application provides the stator core, the housing, the motor cooling system of the electric vehicle, and the electric vehicle, to improve operation stability of the motor of the electric vehicle, prolong service life of the motor, and prolong service life of the electric vehicle. Specifically, the cooling system may include only a system for cooling the stator core and end portions of a stator coil of the motor, or may include a system for lubricating and cooling a rotating member of a reducer main body that is connected to the motor. Specifically, the rotating member of the reducer main body includes meshing gears and also includes a bearing. The cooling system provided in this application uses an oil-cooled heat dissipation technology. Cooling oil is first used to dissipate heat for the stator core of a motor main body, and then flows to two ends of the stator coil to dissipate heat for the end portions of the stator coil. Therefore, there are larger flow amounts of cooling oil flowing through both the stator core and the end portions of the stator coil, which helps increase a heat transfer coefficient of the cooling system and improve cooling efficiency of the cooling system. The following describes the cooling system in detail with reference to the accompanying drawings.

Figure 2:
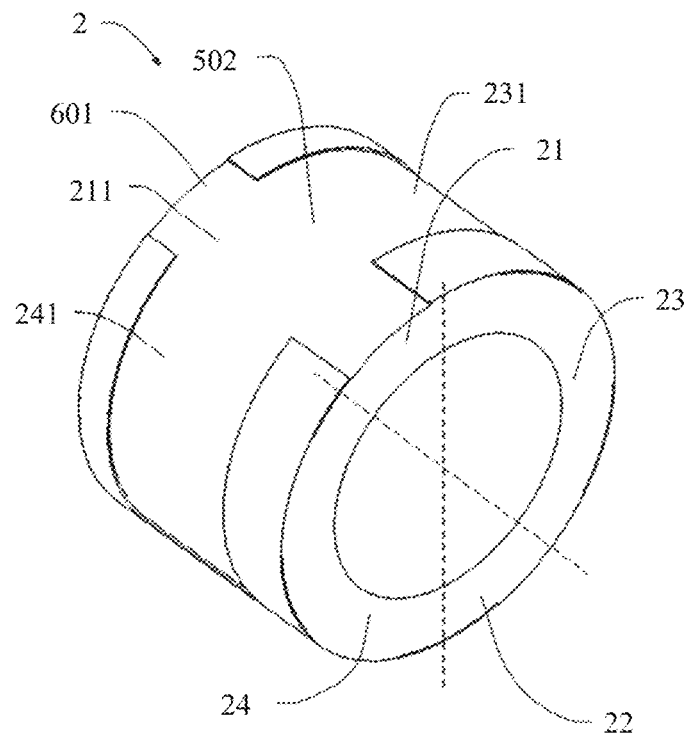
FIG. 2 is a schematic structural diagram of a stator core according to an embodiment of this application.
Figure 3:
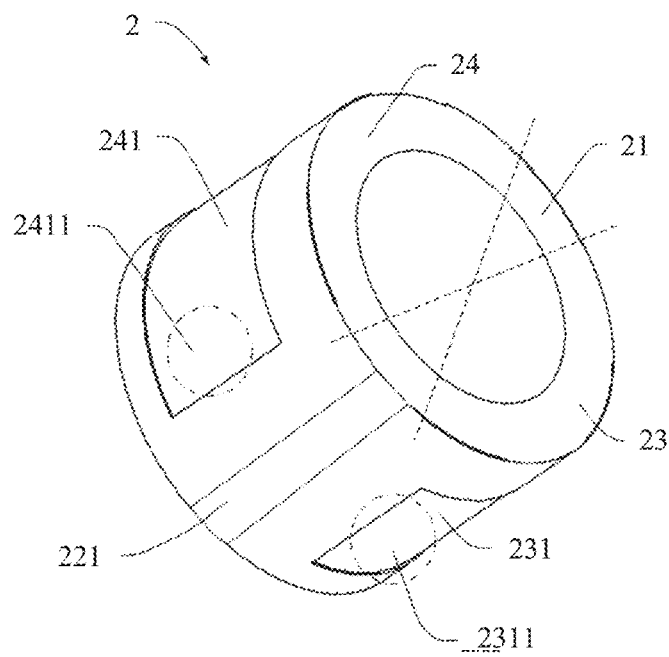
FIG. 3 is another schematic structural diagram of a stator core according to an embodiment of this application.
Figure 4:
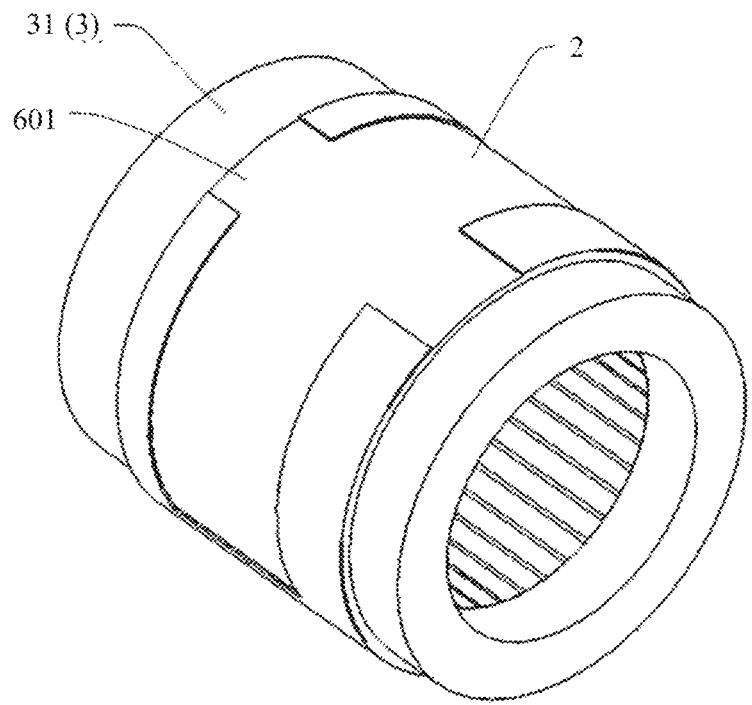
FIG. 4 is a schematic structural diagram of a stator core and a core coil according to an embodiment of this application.

As shown in FIG. 1, an embodiment of this application provides a motor cooling system of an electric vehicle. The cooling system includes a housing 1, and a stator core 2 and a stator coil 3 are disposed in the housing 1. Specifically, refer to FIG. 2 and FIG. 3. FIG. 2 is a schematic structural diagram of a stator core according to an embodiment of this application, and FIG. 3 is another schematic structural diagram of a stator core according to an embodiment of this application. The stator core 2 is a barrel-shaped stator core, and may be specifically a stator core in a round barrel shape. FIG. 4 is a schematic structural diagram of a stator core and a core coil according to an embodiment of this application. Usually, the stator core 2 includes a plurality of tooth portions extending in an axial direction of the stator core 2. The tooth portions are distributed at intervals in a circumferential direction of the stator core 2, a groove portion is formed between two adjacent tooth portions, and the stator coil 3 is disposed around the tooth portions. A commutating area of the stator coil 3, that is, an end portion 31 of the stator coil, protrudes from the stator core 2 in the axial direction.

Still refer to FIG. 1, FIG. 2, and FIG. 3. The barrel-shaped stator core 2 is divided into four segments in the circumferential direction, which are separately a first segment 21, a third segment 23, a second segment 22, and a fourth segment 24 that are sequentially connected. The first segment 21 is opposite to the second segment 22, the third segment 23 is connected between a first end of the first segment 21 and a first end of the second segment 22, and the fourth segment 24 is connected between a second end of the first segment 21 and a second end of the second segment 22, so that the first segment 21, the third segment 23, the second segment 22, and the fourth segment 24 form the barrel-shaped stator core 2. An outer wall of the first segment 21 includes a coil cooling oil passage groove 211. The coil cooling oil passage groove 211 extends in the axial direction of the stator core 2 and passes through the stator core 2. The coil cooling oil passage groove 211 and an inner wall of the housing 1 fit together to form a coil cooling oil passage 6, so that cooling oil may flow out of two ends of the stator core 2 in the axial direction along the coil cooling oil passage 6, to cool an end portion area of the stator core 2 in the axial direction, for example, the end portion 31 of the stator coil located in the area. An outer wall of the second segment 22 includes an oil return groove 221. The oil return groove 221 extends in the axial direction of the stator core 2 and passes through the stator core 2. The oil return groove 221 and the inner wall of the housing 1 fit together to form an oil return passage 7, so that the cooling oil may flow out of the two ends of the stator core 2 in the axial direction along the oil return groove 221 to flow to an oil storage area, facilitating a next cycle. An outer wall of the third segment 23 includes a core cooling oil passage groove 231. The core cooling oil passage groove 231 extends in the circumferential direction of the stator core 2, and the core cooling oil passage groove 231 and the inner wall of the housing 1 fit together to form a core cooling oil passage 5. In this case, the cooling oil flows in the core cooling oil passage 5, and a circumferential side of the stator core 2 can be cooled, thereby cooling the stator core 2. There is an oil inlet area 2311 at an end that is of the core cooling oil passage groove 231 and that is close to the second segment 22, and there is an oil through port 502 at an end that is of the core cooling oil passage groove 231 and that is close to the first segment 21. The oil inlet area 2311 is opposite to an oil inlet 501 of the core cooling oil passage 5, the oil through port 502 is connected to the coil cooling oil passage groove 211, and therefore the core cooling oil passage groove 231 is connected to the coil cooling oil passage groove 211. The cooling oil may flow from the core cooling oil passage 5 to the coil cooling oil passage 6 through the oil through port 502, and the passages for the cooling oil can be connected in series. In this way, there are larger amounts of cooling oil for cooling both the stator core 2 and the end portion 31 of the stator coil. Therefore, the cooling system has a higher heat transfer coefficient and higher cooling efficiency. An outer wall of the fourth segment 24 also includes a core cooling oil passage groove 241. The core cooling oil passage groove 241 extends in the circumferential direction of the stator core 2. There is an oil inlet area 2411 at an end that is of the core cooling oil passage groove 241 and that is close to the second segment 22, and there is the oil through port 502 at an end that is of the core cooling oil passage groove 241 and that is close to the first segment 21. The oil inlet area 2411 is opposite to the oil inlet 501 of the core cooling oil passage 5, the oil through port 502 is connected to the coil cooling oil passage groove 211, and therefore the core cooling oil passage groove 241 is connected to the coil cooling oil passage groove 211. The cooling oil may flow from the core cooling oil passage 5 to the coil cooling oil passage 6 through the oil through port 502, and the passages for the cooling oil can be connected in series. Further, in a first direction, a distance between the oil inlet 501 and the oil return groove 221 is less than a distance between the oil through port 502 and the oil return groove 221, so that the cooling oil enters from the oil inlet 501 and flows upward along the core cooling oil passage 5 to cool the stator core 2, and then enters the coil cooling oil passage 6 from the oil through port 502, where the first direction is a gravity direction existing when the cooling system is in use.

In a specific embodiment, the oil inlet may be disposed in the stator core, or may be disposed in the housing. This is not specifically limited herein, and may be selected according to a product structure.

In a specific embodiment, the stator core 2 is interference-fitted in a barrel-shaped inner cavity of the housing, so that the inner wall of the housing wraps around an outer wall of the stator core 2. In addition, the inner wall of the housing is closed with the coil cooling oil passage groove 211, the oil return groove 221, and the core cooling oil passage grooves 231 (241) that are on the outer wall of the stator core 2, and closely covers openings of the foregoing grooves, to form the coil cooling oil passage 6, the oil return passage, and the core cooling oil passage 5. In this embodiment, the motor cooling system requires only that grooves be made on the outer wall of the stator core 2, and a manufacturing process is comparatively simple. In addition, larger rigidity of the stator core 2 brings more stability to a structure of the core cooling oil passage 5. In this embodiment, the cooling oil may also be in direct contact with the stator core 2, achieving a better cooling effect.

Still refer to FIG. 1. Specifically, the cooling system includes a power apparatus 4, the core cooling oil passage 5, and the coil cooling oil passage 6 that are sequentially connected. After the cooling oil flows through the core cooling oil passage 5 and the coil cooling oil passage 6 under power provided by the power apparatus 4, the cooling oil returns to the oil return passage 7, where the oil return groove 221 is configured to accommodate the cooling oil. The oil return passage 7 is connected to the power apparatus 4. The power apparatus 4 drives the cooling oil that flows back to the oil return passage 7 to flow into the core cooling oil passage 5 again, to implement recycling of the cooling oil. Specifically, the core cooling oil passage 5 is located on the circumferential side of the stator core 2, and extends in the circumferential direction of the stator core 2. Specifically, the core cooling oil passage 5 may be located between the stator core 2 and the housing 1, and are configured to cool the stator core 2. The core cooling oil passage 5 extends along a circumferential side wall of the stator core 2 to connect to the coil cooling oil passage 6. The coil cooling oil passage 6 extends in the axial direction of the stator core. The core cooling oil passage 5 is connected to the coil cooling oil passage 6 through the oil through port 502. The cooling oil in the core cooling oil passage 5 enters the coil cooling oil passage 6 through the oil through port 502. In addition, the core cooling oil passage 5 includes the oil inlet 501, and the cooling oil enters the core cooling oil passage 5 through the oil inlet 501 for cycling. In the first direction, the oil return passage 7 is located at a low position in the housing 1 of the cooling system. The first direction is the gravity direction existing when the cooling system is in use, and therefore the oil return passage 7 is located at the bottom, which facilitates collection of the cooling oil after operation. Further, in the first direction, a distance between the oil inlet 501 and the oil return passage 7 is less than a distance between the oil through port 502 and the oil return passage 7, so that the cooling oil enters from the oil inlet 501 and flows upward along the core cooling oil passage 5 to cool the stator core 2, and then enters the coil cooling oil passage 6 through the oil through port 502. The coil cooling oil passage 6 includes a first oil outlet 601, and the first oil outlet 601 is located at an end portion of the stator core 2. The cooling oil is discharged from the first oil outlet 601 and sprays to the end portion 31 of the stator coil to cool the stator coil 3, and then falls back to the oil return passage 7. After being collected, the cooling oil can be recycled. In the cooling system in this embodiment of this application, the core cooling oil passage 5 and the coil cooling oil passage 6 are sequentially connected, which implements serial connection of the passages for the cooling oil. In this way, there are larger amounts of cooling oil for cooling both the stator core 2 and the end portion 31 of the stator coil. Therefore, the cooling system has a higher heat transfer coefficient and higher cooling efficiency. In addition, in the technical solutions of this application, the cooling oil flows in the cooling oil passages by using a driving force of the power apparatus 4, there is a comparatively even flow amount of cooling oil in each cooling oil passage, and thus a cooling effect is also better.

Refer to FIG. 1 and FIG. 3. In this implementation, the cooling system includes two core cooling oil passages 5. The two core cooling oil passages 5 are located on two sides of the oil return passage 7, and are a first oil passage 503 and a second oil passage 504 separately. The first oil passage 503 extends on one side of the stator core 2 in the circumferential direction, and the second oil passage 504 extends on the other side of the stator core 2 in the circumferential direction. In other words, along a section perpendicular to the axial direction of the stator core 2, a line between a projection of the oil return passage 7 and a projection of the coil cooling oil passage 6 is located between a projection of the first oil passage 503 and a projection of the second oil passage 504. The first oil passage 503 and the second oil passage 504 each have one oil inlet 501. FIG. 3 shows the oil inlet area 2311 and the oil inlet area 2411 that are corresponding to the oil inlets 501. In this embodiment, the core cooling oil passages 5 include two oil inlets 501. The cooling oil enters the first oil passage 503 from the oil inlet 501 of the first oil passage 503, and flows along the first oil passage 503 to the coil cooling oil passage 6. The cooling oil also enters the second oil passage 504 from the oil inlet 501 of the second oil passage 504, and flows along the second oil passage 504 to the coil cooling oil passage 6. In this embodiment, the oil that enters both the core cooling oil passages 5 may flow into the coil cooling oil passage 6. Therefore, there is a larger flow amount of cooling oil in the coil cooling oil passage 6, which helps improve a cooling effect of the cooling system on the stator coil 3.

In a specific embodiment, the power apparatus may be a pump, and more specifically, may be an oil pump or a water pump, configured to provide power for cooling oil flowing in the cooling system.

It should be noted that "extending in a specific direction" in this application means that an extension direction of a structure roughly coincides with the specific direction, and a size in the "extension" direction is usually far greater than a size perpendicular to the "extension" direction. Therefore, in this application, that "the coil cooling oil passage groove extends in the axial direction of the stator core" means that an extension direction of the coil cooling oil passage groove roughly coincides with the axial direction of the stator core, and the extension direction of the coil cooling oil passage groove may deviate from the axial direction of the core to some extent. Likewise, that "the core cooling oil passage groove extends in the circumferential direction of the stator core" means that an extension direction of the core cooling oil passage groove roughly coincides with the circumferential direction of the stator core, and the extension direction of the core cooling oil passage groove may deviate from the circumferential direction of the stator core to some extent.

In addition, the coil cooling oil passage groove in this application is usually a straight linear structure, but may also be implemented as another non-linear structure. For example, there is bending or rotation to some extent. The core cooling oil passage groove in this application is usually a curve structure with a smooth transition, but may also be implemented as another curve structure with a non-smooth transition. For example, there is some bending or rotation.

Still refer to FIG. 1 and FIG. 4. In a specific embodiment of this application, two ends of the stator coil 3 protrude from the stator core 2 in the axial direction. The coil cooling oil passage 6 may include at least two first oil outlets 601. Each end portion 31 of the stator coil is corresponding to at least one first oil outlet 601. The cooling oil that enters the coil cooling oil passage 6 is discharged through the first oil outlet 601, and sprays to the end portions 31 of the stator coil. In other words, the cooling oil is discharged from both the ends of the stator coil 3, thereby cooling the stator coil 3. After the cooling oil discharged from the coil cooling oil passage 6 dissipates heat for the end portions 31 of the stator coil, the cooling oil falls back to the oil return passage 7 located at the bottom of the housing 1 under action of gravity, so that the power apparatus 4 that is connected to the oil return passage 7 can drive the cooling oil to enter the core cooling oil passage 5 again, to implement cycling of the cooling oil.

Still refer to FIG. 1. In a specific embodiment of this application, the first oil outlet 601 of the coil cooling oil passage 6 is higher than the end portion 31 of the stator coil in the first direction. In this case, the cooling oil flowing out of the first oil outlet 601 flows to the end portion 31 of the stator coil under action of gravity, to cool the stator coil 3. No other fitting structure needs to be disposed. Therefore, a structure of the cooling system is comparatively simple.

In an optional embodiment of this application, on a section that passes through the oil inlet area and that is perpendicular to the axial direction of the stator core, that is, on a section that passes through the oil inlet and that is perpendicular to the axial direction of the stator core, a circumferential distance $L_1$ between an axis of the oil return groove and the oil inlet area, and an outer circumference L of the stator core meet: $L_1 \leq \frac{1}{8}L$. The foregoing "circumferential" refers to the circumferential direction of the stator core. In this embodiment, the oil inlet of the core cooling oil passage is close to the oil return groove, and the oil return groove is located at the bottom of the cooling system when in use. Therefore, the oil inlet is located at the bottom of the cooling system and is close to the oil return groove, so that the cooling oil enters the cooling system from the bottom of the cooling system, and runs upward to the oil through port. In this way, a cooling path for the stator core can be lengthened, which helps improve cooling efficiency of the cooling system. Specifically, a smaller circumferential distance between the oil inlet and the oil return groove is better, thereby helping lengthen a cooling path of the stator core, and improving uniformity of stator core cooling performed by the cooling system.

In another optional embodiment, on a section that is of the stator core and that passes through the oil through port, where the section is perpendicular to the axial direction of the stator core, a circumferential distance $L_2$ between the axis of the oil return groove and the oil through port, and the outer circumference L of the stator core meet: $L_2 \geq \frac{3}{8}L$. In this technical solution, the oil through port of the core cooling oil passage is far away from the oil return groove, and the oil return groove is located at the bottom of the cooling system when in use. Therefore, the oil through port is located at the top of the cooling system. The cooling oil enters the cooling system from the bottom of the cooling system, and runs upward to the oil through port at the top with power provided by the power apparatus. In this way, there is a longer running path, which achieves a better heat dissipation effect on the stator core. Specifically, a longer circumferential distance between the oil through port and the oil return groove is better, thereby helping lengthen a cooling path of the stator core, and further improving uniformity of stator core cooling performed by the cooling system.

In still another optional technical solution, along the section perpendicular to the axial direction of the stator core, a total circumferential length $L_3$ of projections of the core cooling oil passage grooves and the outer circumference L of the stator core meet: $L_3 \geq \frac{9}{10}L$. In this technical solution, the core cooling oil passage covers at least nine tenths of an area on the circumferential side of the stator core, and a larger coverage area is better, so that there is a longer heat dissipation path of the stator core, and heat dissipation uniformity is better, which helps improve a heat dissipation effect on the stator core and further improve cooling efficiency of the entire cooling system.

In a further embodiment, referring to FIG. 1, along the section perpendicular to the axial direction of the stator core 2, an axis of the coil cooling oil passage groove 211 is located at a highest position of the stator core 2 in the first direction. In this case, an axis of the coil cooling oil passage 6 is located at the highest position of the stator core 2 in the first direction. In this technical solution, the core cooling oil passages 5 may be disposed on two sides of the coil cooling oil passage 6. As shown in FIG. 3, the first oil passage 503 and the second oil passage 504 are separately located on the two sides of the coil cooling oil passage 6, and a path length of the first oil passage 503 and a path length of the second oil passage 504 may be set to be comparatively close, so that uniformity of stator core 1 cooling can be increased. In addition, in this embodiment, the first oil outlet may be located at the highest position of the stator core in the first direction, thereby facilitating cooling oil spraying to the end portion of the coil. Specifically, the oil return passage 7 is located at a lowest position of the stator core in the first direction, thereby facilitating cooling oil collection.

Figure 5:
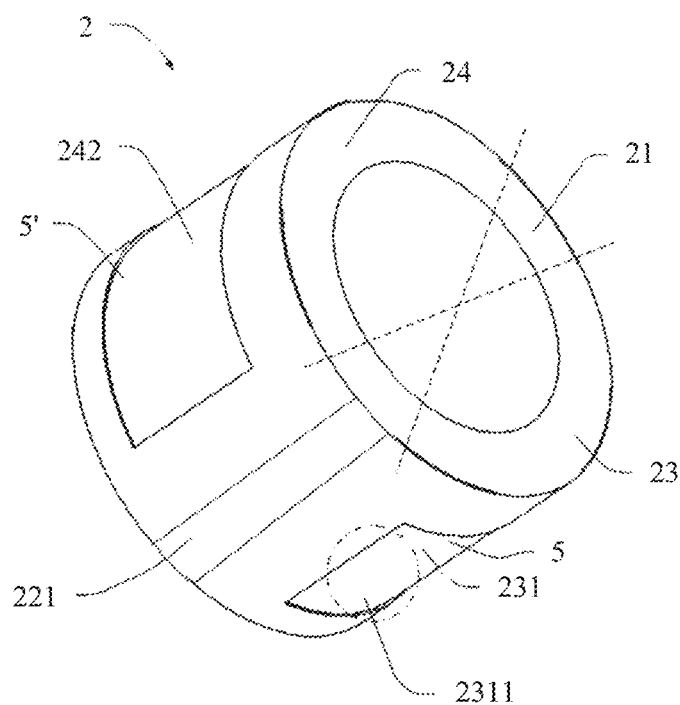
FIG. 5 is another schematic structural diagram of a stator core according to an embodiment of this application.

Refer to FIG. 1, FIG. 2, and FIG. 5. FIG. 5 is another schematic structural diagram of a stator core according to an embodiment of this application. In another specific embodiment of this application, the outer wall of the fourth segment 24 of the stator core 2 includes a core oil return passage groove 242 that extends in the circumferential direction. An end that is of the core oil return passage groove 242 and that is close to the second segment 22 is connected to the oil return groove 221. An end that is of the core oil return passage groove 242 and that is close to the first segment 21 is connected to the coil cooling oil passage groove 211. After the stator core 2 is mounted in the housing 1, the core oil return passage groove 242 and the inner wall of the housing 1 fit together to form the core oil return passage 5'.

In this embodiment, the cooling system further includes the core oil return passage 5'. The core oil return passage 5' and the core cooling oil passage 5 are located on two sides of the oil return passage 7. To be specific, the core oil return passage 5' extends on one side of the stator core 2 in the circumferential direction, and the core cooling oil passage 5 extends on the other side of the stator core 2 in the circumferential direction. In other words, along a section perpendicular to the axial direction of the stator core 2, a line between a projection of the oil return passage 7 and a projection of the coil cooling oil passage 6 is located between a projection of the core oil return passage 5' and a projection of the core cooling oil passage 5. One end of the core oil return passage 5' is connected to the coil cooling oil passage 6, and the other end of the core oil return passage 5' is connected to the oil return passage 7. In this embodiment, the cooling system includes only one oil inlet 501. FIG. 5 shows one oil inlet area 2311. The cooling oil enters the core cooling oil passage 5 from the oil inlet 501, flows along the core cooling oil passage 5 to the coil cooling oil passage 6, and then flows to the core oil return passage 5'. The cooling oil that enters the core oil return passage 5' flows back to the oil return passage 7 for cycling. In this embodiment, only one oil inlet 501 may be disposed, which achieves a comparatively simple structure. In addition, all the cooling oil first enters the core cooling oil passage 5, and a part of the oil may enter the core oil return passage 5', so that there is a larger amount of cooling oil for cooling the stator core. Therefore, a cooling effect on the stator core can be improved.

In an optional embodiment of this application, the core cooling oil passage extends straightly in the circumferential direction of the stator core. The core cooling oil passage in this embodiment has a comparatively simple structure, which facilitates manufacturing. In another optional embodiment, the core cooling oil passage extends obliquely in the circumferential direction of the stator core, thereby lengthening a cooling path of the cooling system, and also facilitating manufacturing. In another optional embodiment, the core cooling oil passage extends in a wave shape in the circumferential direction of the stator core. In this embodiment, a path of the core cooling oil passage is comparatively long, achieving a better cooling effect on the stator core.

Figure 6:
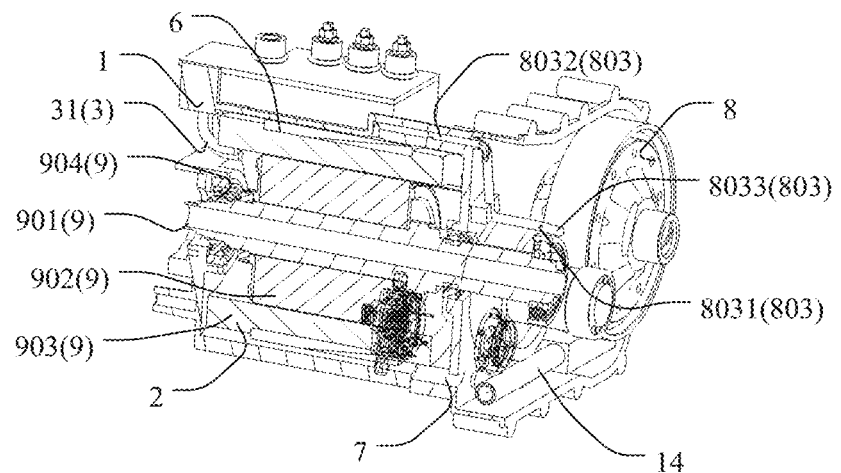
FIG. 6 is a schematic cross-sectional structural diagram of a cooling system according to an embodiment of this application.
Figure 7:
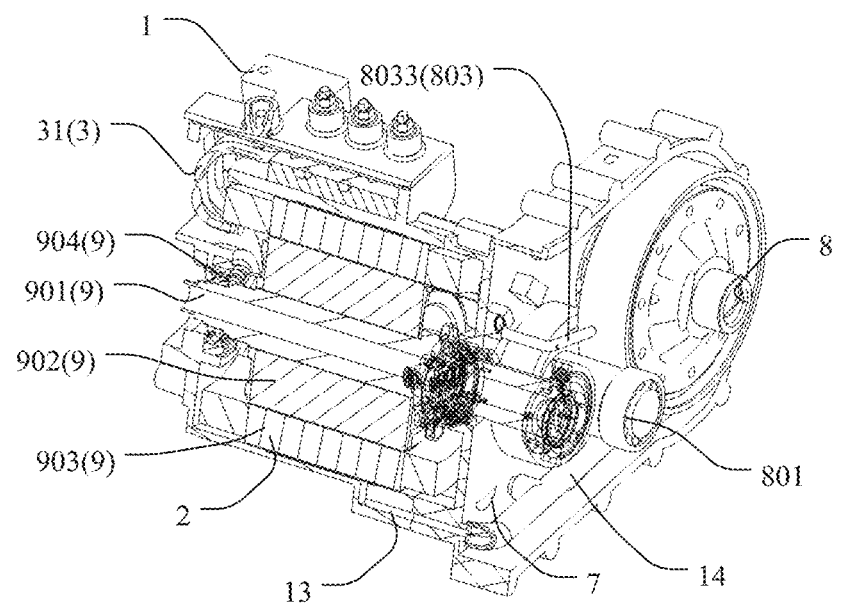
FIG. 7 is another schematic cross-sectional structural diagram of a cooling system according to an embodiment of this application.

Refer to FIG. 1, FIG. 6, and FIG. 7. FIG. 6 is a schematic cross-sectional structural diagram of a cooling system according to an embodiment of this application. FIG. 7 is another schematic cross-sectional structural diagram of a cooling system according to an embodiment of this application. In a further embodiment of this application, the cooling system further includes a reducer main body 8, where the reducer main body 8 includes a reducer oil passage 803, and the reducer main body 8 is connected to an output shaft of a motor main body 9 to convert a rate of the output shaft of the motor to a rate required for production. The reducer main body 8 and the motor main body 9 may be integrated into a reduction motor for use. The motor main body 9 includes a rotating shaft 901, a rotor 902, and a stator 903, where the stator 903 includes the stator core 2 and the stator coil 3. The reducer main body 8 includes a rotating member, and specifically, the rotating member includes a bearing 801 and gears for meshing transmission. In this embodiment, the reducer oil passage 803 is connected to the core cooling oil passage grooves, that is, the reducer oil passage 803 is connected to the core cooling oil passage 5; or the reducer oil passage 803 is connected to the coil cooling oil passage groove 211, that is, the reducer oil passage 803 is connected to the coil cooling oil passage 6. The reducer oil passage 803 includes a second oil outlet 8031, so that the cooling oil can be discharged from the second oil outlet 8031 and spray to an operation area of the rotating member of the reducer main body 8. The operation area of the rotating member refers to a rotating portion of the bearing 801 and a gear meshing portion 802. On the one hand, the rotating member of the reducer main body 8 can be lubricated, and on the other hand, the reducer main body 8 can also be cooled. In this embodiment, for the reduction motor including the motor main body 9 and the reducer main body 8, there is no need to separately dispose an oil loop for the reducer main body 8, which can simplify the structure of the cooling system, and in addition, improve utilization of the cooling oil in the cooling system.

Refer to FIG. 6 and FIG. 7. In a further embodiment, the reducer oil passage 803 includes a first oil passage portion 8032 located in the housing 1, and a bending portion 8033 extending into the housing 1. The first oil passage portion 8032 is connected to the core cooling oil passage 5 or connected to the coil cooling oil passage 6. The bending portion 8033 includes a plurality of second oil outlets 8031, and the bending portion 8033 may be bent according to a structure layout of the reducer main body 8, so that an operation area of each rotating member of the reducer main body 8 is corresponding to at least one second oil outlet 8031. In this way, the cooling oil from the second oil outlet 8031 can spray directly toward the gear meshing portion 802 or the rotating portion of the bearing 801, to improve a spray effect and improve cooling and lubrication, performed by the cooling system, of the operation area of the rotating member in the reducer main body 8.

Refer to FIG. 1, FIG. 6, and FIG. 7. In a specific embodiment, the reducer main body 8 is disposed in the housing 1, and the first oil passage portion 8032 of the reducer oil passage 803 may be made in the housing 1 and be connected to the core cooling oil passage 5. The bending portion 8033 of the reducer oil passage 803 extends to an area where the gears and the bearing 801 of the reducer main body 8 are located. The bending portion 8033 includes the second oil outlet 8031 that is corresponding to each gear meshing portion 802 and the rotating portion of the bearing 801, so that the cooling oil flowing from the core cooling oil passage 5 to the reducer oil passage 803 can be discharged from the second oil outlet 8031 of the reducer oil passage 803, and fall to an operation position of the rotating member of the reducer, thereby lubricating and cooling the reducer main body 8. Further, there is an oil pool 10 at a position that is of the housing 1 and that is opposite to the reducer main body 8. The cooling oil discharged from the reducer oil passage 803 falls into the oil pool 10 after operation, where the oil pool 10 stores the cooling oil. The oil return passage 7 is also connected to the oil pool 10, and the power apparatus may drive the cooling oil from the oil pool 10 to the core cooling oil passage 5, thereby implementing recycling of the cooling oil in the cooling system.

Figure 8:
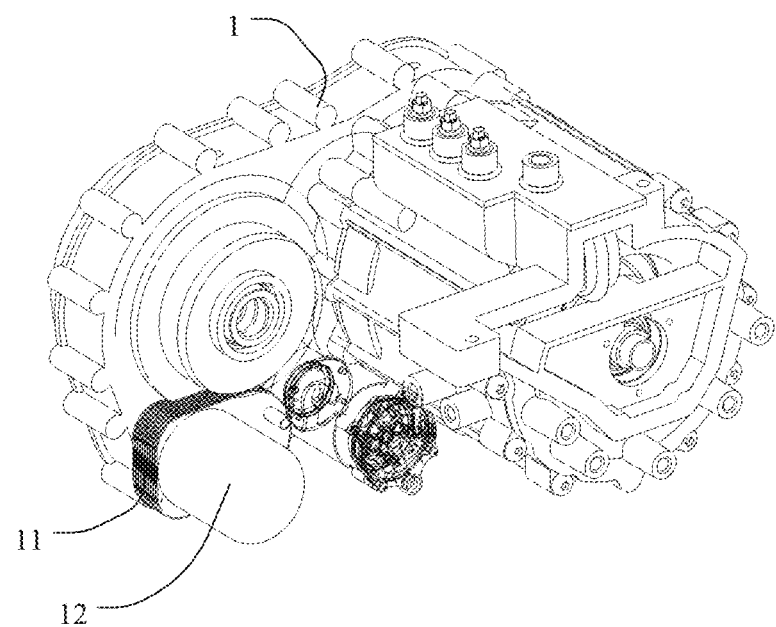
FIG. 8 is a schematic structural diagram of a cooling system according to an embodiment of this application.

Refer to FIG. 1 and FIG. 8. FIG. 8 is a schematic structural diagram of a cooling system according to an embodiment of this application. In another embodiment of this application, the cooling system further includes an oil-cooled heat exchanger 11, where the oil-cooled heat exchanger 11 is connected to the oil return passage 7. The oil-cooled heat exchanger 11 may cool the cooling oil, so that the cooling oil in the cooling system can be kept at a comparatively low temperature. Even if the motor main body 9 operates for a comparatively long time or operates with comparatively high efficiency, a temperature of the cooling oil can also be reduced in time. A comparatively reliable cooling effect can be provided for the motor main body 9.

Specifically, the oil-cooled heat exchanger may perform heat exchange on the cooling oil once in each cycling process of the cooling oil, to effectively keep the cooling oil at a comparatively low temperature. Alternatively, in another specific embodiment, the cooling system may be controlled. When a temperature of the cooling oil is higher than a set value, the oil-cooled heat exchanger is started, to perform cooling processing on the cooling oil. When a temperature of the cooling oil is lower than a set value, the oil-cooled heat exchanger does not need to be started. This solution can improve operation efficiency of the oil-cooled heat exchanger and prolong service life of the oil-cooled heat exchanger.

Still refer to FIG. 1 and FIG. 8. In a further embodiment, the cooling system further includes a filter 12, where the filter 12 is connected to the oil return passage 7. The filter 12 may filter the cooling oil, so that the cooling oil is kept in a comparatively clean state. On the one hand, parts and components of the motor main body 9 and parts and components of the reducer main body 8 are not liable to pollution, and on the other hand, the clean cooling oil is not liable to block the oil passages, which helps keep the oil passages unobstructed, thereby maintaining the cooling effect of the cooling system.

Still refer to FIG. 1 and FIG. 8. In a specific embodiment, the oil-cooled heat exchanger 11 and the filter 12 are connected to the oil pool 10 by using the power apparatus 4, and are located in an area of the housing 1 in which the reducer main body 8 is located. Specifically, the cooling oil in the oil pool 10 may be driven by the power apparatus 4 to the filter 12 for filtering, then driven to the oil-cooled heat exchanger 11 for heat exchange and cooling, and then enter the core cooling oil passage 5.

Still refer to FIG. 1 and FIG. 8. In a further embodiment, the oil-cooled heat exchanger 11 and the filter 12 of the cooling system are integrated as an integral structure, so that the structure of the cooling system can be simplified, and the cooling system occupies smaller space and features higher integration.

Refer to FIG. 7. The cooling system further includes an oil inlet passage 13. The oil inlet passage 13 is connected to the oil inlet 501 of the core cooling oil passage 5. The cooling oil enters the core cooling oil passage 5 from the oil inlet passage 13. The oil inlet passage 13 and the oil return passage 7 are disposed in parallel. This structure can improve structural integration of the cooling system. Specifically, the oil inlet passage 13 and the oil return passage 7 may be made in the housing 1, which can also improve integration of the cooling system. In addition, structural rigidity of the oil inlet passage 13 can be improved, and the oil inlet passage 13 is not liable to damage.

Figure 9:
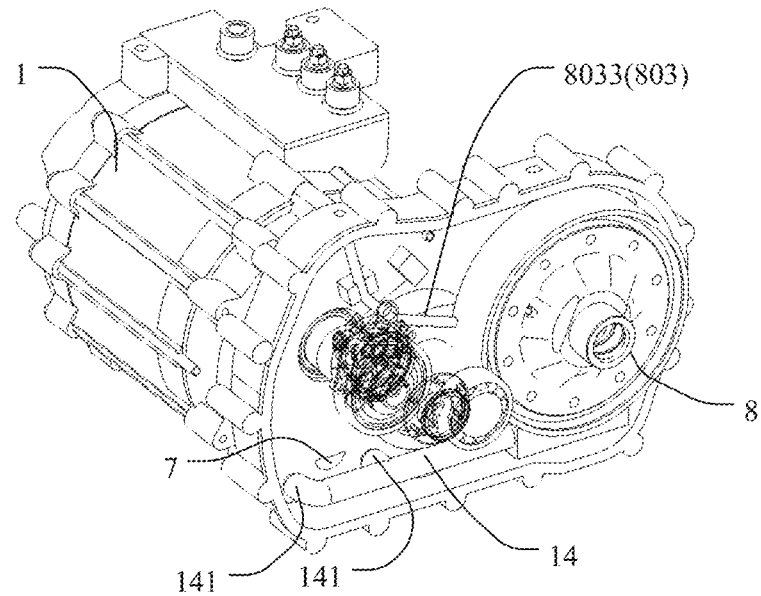
FIG. 9 is a schematic partial view of a cooling system according to an embodiment of this application.
Figure 10:
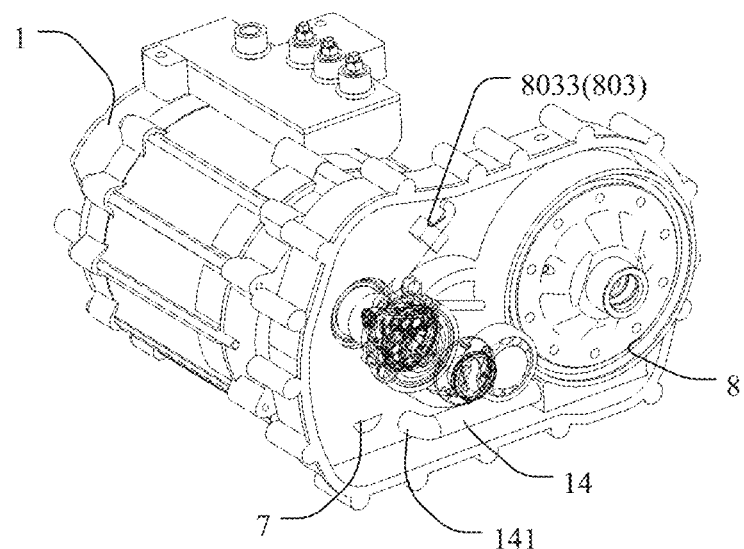
FIG. 10 is another schematic partial view of a cooling system according to an embodiment of this application.

Specifically, refer to FIG. 1, FIG. 9, and FIG. 10. FIG. 9 is a schematic partial view of a cooling system according to an embodiment of this application. FIG. 10 is another schematic partial view of a cooling system according to an embodiment of this application. In a further embodiment, the oil inlet passage 13 is connected to an oil inlet pipe 14, and the oil inlet pipe 14 is connected to the power apparatus 4, so that the power apparatus drives the cooling oil in the oil pool 10 to the oil inlet passage 13 by using the oil inlet pipe 14. In a specific embodiment, referring to FIG. 9, when the first oil passage 503 and the second oil passage 504 each include the oil inlet 501, the oil inlet pipe 14 may include two oil inlet pipe branches 141. One oil inlet pipe branch 141 is connected to one oil inlet 501 of the core cooling oil passage 5, and the other oil inlet pipe branch 141 is connected to the other oil inlet 501 of the core cooling oil passage 5. Refer to FIG. 10. The cooling system further includes the core oil return passage 5'. When only the core cooling oil passage 5 includes the oil inlet 501, the oil inlet pipe 14 includes one oil inlet pipe branch 141. The oil inlet pipe branch 141 is connected to the oil inlet 501 of the core cooling oil passage 5.

Refer to FIG. 1. In a further embodiment, the cooling system further includes an oil guide groove 15. The oil guide groove 15 guides a part of the cooling oil that sprays to the end portion 31 of the stator coil 3 to a bearing 904 of the motor main body, to cool and lubricate the bearing 904 of the motor main body, thereby improving an operation effect of the bearing 904 of the motor main body. Further, the cooling oil may be collected under the bearing 904 of the motor main body and spray again to a portion that is of the end portion 31 of the stator coil and that is close to the oil return passage 7, to improve utilization of the cooling oil.

Refer to FIG. 1. This application further provides another motor cooling system of an electric vehicle, including a housing 1, where the housing 1 includes a barrel-shaped inner cavity, and a stator core 2 and a stator coil 3 are mounted in the barrel-shaped inner cavity of the housing 1. Specifically, the stator core 2 is a barrel-shaped stator core, and may be specifically a stator core in a round barrel shape. Usually, the stator core 2 includes a plurality of tooth portions extending in an axial direction of the stator core 2. The tooth portions are distributed at intervals in a circumferential direction of the stator core 2, a groove portion is formed between two adjacent tooth portions, and the stator coil 3 is disposed around the tooth portions. A commutating area of the stator coil 3, that is, an end portion 31 of the stator coil, protrudes from the stator core 2 in the axial direction. The motor cooling system of an electric vehicle herein differs from the foregoing motor cooling system of an electric vehicle in the following.

Figure 11:
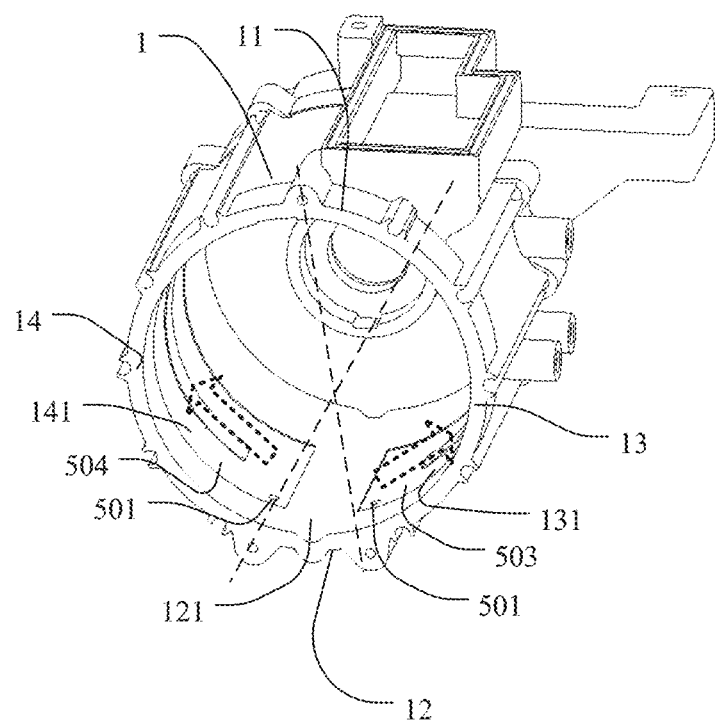
FIG. 11 is a schematic partial view of a cooling system according to an embodiment of this application.
Figure 12:
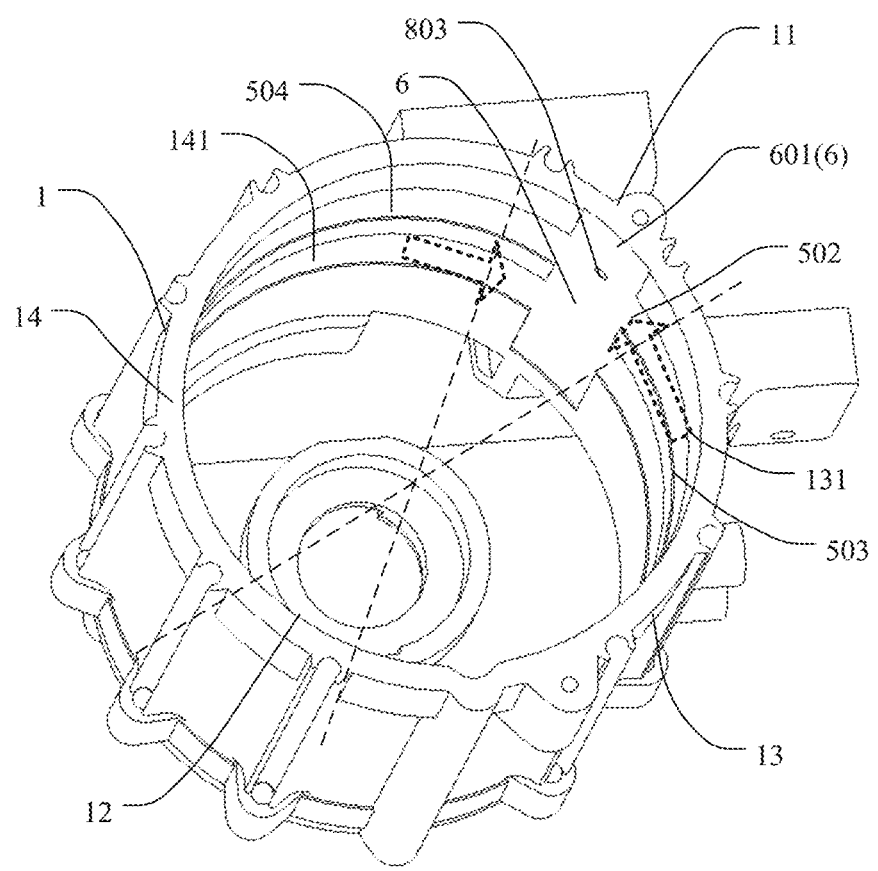
FIG. 12 is another schematic partial view of a cooling system according to an embodiment of this application.

Still refer to FIG. 1, FIG. 11, and FIG. 12. FIG. 11 is a schematic partial view of a cooling system according to an embodiment of this application. FIG. 12 is another schematic partial view of a cooling system according to an embodiment of this application. The housing 1 includes a first portion 11, a third portion 13, a second portion 12, and a fourth portion 14 that are sequentially connected in a circumferential direction of the barrel-shaped inner cavity. The first portion 11 is opposite to the second portion 12, the third portion 13 is connected between a first end of the first portion 11 and a first end of the second portion 12, and the fourth portion 14 is connected between a second end of the first portion 11 and a second end of the second portion 12, so that the first portion 11, the third portion 13, the second portion 12, and the fourth portion 14 form the housing 1 that includes the barrel-shaped inner cavity. An inner wall of the first portion 11 includes a coil cooling oil passage groove 111. The coil cooling oil passage groove 111 extends in an axial direction of the barrel-shaped inner cavity of the housing, and the coil cooling oil passage groove 111 and an outer wall of the stator core 2 fit together to form a coil cooling oil passage 6. Two ends of the coil cooling oil passage 6 protrude from two ends of the stator core 2 in the axial direction, so that cooling oil may flow out of the two ends of the stator core 2 in the axial direction along the coil cooling oil passage 6, to cool an end portion area of the stator core 2 in the axial direction, for example, the end portion 31 of the stator coil located in the area. An inner wall of the second portion 12 includes an oil return groove 121. The oil return groove 121 extends in the axial direction of the barrel-shaped inner cavity of the housing, and the oil return groove 121 and an inner wall of the housing fit together to form an oil return passage, so that the cooling oil may flow to an oil storage area along the oil return groove 121, facilitating a next cycle. An inner wall of the third portion 13 includes a core cooling oil passage groove 131. The core cooling oil passage groove 131 extends in the circumferential direction of the barrel-shaped inner cavity of the housing 1, and the core cooling oil passage groove 131 and the inner wall of the housing 1 fit together to form a core cooling oil passage 5. The core cooling oil passage 5 is located on a circumferential side of the stator core 2, and the cooling oil flows in the core cooling oil passage 5, so that the circumferential side of the stator core 2 can be cooled, thereby cooling the stator core 2. There is an oil inlet 501 at an end that is of the core cooling oil passage groove 131 and that is close to the second portion 12, and there is an oil through port 502 at an end that is of the core cooling oil passage groove 131 and that is close to the first portion 11. The oil through port 502 is connected to the coil cooling oil passage groove 111, and therefore the core cooling oil passage groove 131 is connected to the coil cooling oil passage groove 111. The cooling oil may flow from the core cooling oil passage 5 to the coil cooling oil passage 6 through the oil through port 502, and the passages for the cooling oil can be connected in series. In this way, there are larger amounts of cooling oil for cooling both the stator core 2 and the end portion 31 of the stator coil. Therefore, the cooling system has a higher heat transfer coefficient and higher cooling efficiency. An inner wall of the fourth portion 14 also includes a core cooling oil passage groove 141. The core cooling oil passage groove 141 extends in the circumferential direction of the barrel-shaped inner cavity of the housing 1, and the core cooling oil passage groove 141 and the inner wall of the housing 1 fit together to form the core cooling oil passage 5. The core cooling oil passage 5 is located on the circumferential side of the stator core 2. There is the oil inlet at an end that is of the core cooling oil passage groove 141 and that is close to the second portion 12, and there is the oil through port 502 at an end that is of the core cooling oil passage groove 141 and that is close to the first portion 11. The oil through port 502 is connected to the coil cooling oil passage groove 111, and therefore the core cooling oil passage groove 141 is connected to the coil cooling oil passage groove 111. The cooling oil may flow from the core cooling oil passage 5 to the coil cooling oil passage 6 through the oil through port, and the passages for the cooling oil can be connected in series. Further, in a first direction, a distance between the oil inlet 501 and the oil return groove 121 is less than a distance between the oil through port 502 and the oil return groove 121, so that the cooling oil enters from the oil inlet 501 and flows upward along the core cooling oil passage 5 to cool the stator core 2, and then enters the coil cooling oil passage 6 from the oil through port 502, where the first direction is a gravity direction existing when the cooling system is in use.

In a specific embodiment, the stator core 2 is interference-fitted in the barrel-shaped inner cavity of the housing 1, so that the inner wall of the housing 1 wraps around the outer wall of the stator core 2. In this case, the outer wall of the stator core 2 is closed with the coil cooling oil passage groove 111, the oil return groove 121, and the core cooling oil passage grooves 131 (141) that are on the inner wall of the housing 1, and closely covers openings of the foregoing grooves, to form the coil cooling oil passage 6, the oil return passage 7, and the core cooling oil passage 5. In this embodiment, the motor cooling system requires only that grooves be made on the inner wall of the housing 1, and a manufacturing process is comparatively simple. In addition, larger rigidity of the housing 1 brings more stability to a structure of the core cooling oil passage 5. In this embodiment, the cooling oil may also be in direct contact with the stator core 2, achieving a better cooling effect.

Specifically, the cooling system includes a power apparatus 4, the core cooling oil passage 5, and the coil cooling oil passage 6 that are sequentially connected. After the cooling oil flows through the core cooling oil passage 5 and the coil cooling oil passage 6 under power provided by the power apparatus 4, the cooling oil returns to the oil return passage 7, where the oil return groove 121 is configured to accommodate the cooling oil. The oil return passage 7 is connected to the power apparatus 4. The power apparatus 4 drives the cooling oil that flows back to the oil return passage 7 to flow into the core cooling oil passage 5 again, to implement recycling of the cooling oil. Specifically, the core cooling oil passage 5 is located on the circumferential side of the stator core 2, and extends in the circumferential direction of the stator core. Specifically, the core cooling oil passage 5 may be located between the stator core 2 and the housing 1, and is configured to cool the stator core 2. The core cooling oil passage 5 extends along a circumferential side wall of the stator core 2 to connect to the coil cooling oil passage 6. The coil cooling oil passage 6 extends in the axial direction of the stator core. The core cooling oil passage 5 is connected to the coil cooling oil passage 6 through the oil through port 502. The cooling oil in the core cooling oil passage 5 enters the coil cooling oil passage 6 through the oil through port 502. In addition, the core cooling oil passage 5 includes the oil inlet 501, and the cooling oil enters the core cooling oil passage 5 through the oil inlet 501 for cycling. In the first direction, the oil return passage 7 is located at a low position in the housing 1 of the cooling system. The first direction is the gravity direction existing when the cooling system is in use, and therefore the oil return passage 7 is located at the bottom, which facilitates collection of the cooling oil after operation. Further, a distance between the oil inlet 501 and the oil return passage 7 is less than a distance between the oil through port 502 and the oil return passage 7, so that the cooling oil enters from the oil inlet 501 and flows upward along the core cooling oil passage 5 to cool the stator core 2, and then enters the coil cooling oil passage 6 through the oil through port 502. The coil cooling oil passage 6 includes a first oil outlet 601, and the first oil outlet 601 is located at an end portion of the stator core 2. The cooling oil is discharged from the first oil outlet 601 and sprays to the end portion 31 of the stator coil to cool the stator coil 3, and then falls back to the oil return passage 7. After being collected, the cooling oil can be recycled. In the cooling system in this embodiment of this application, the core cooling oil passage 5 and the coil cooling oil passage 6 are sequentially connected, which implements serial connection of the passages for the cooling oil. In this way, there are larger amounts of cooling oil for cooling both the stator core 2 and the end portion 31 of the stator coil. Therefore, the cooling system has a higher heat transfer coefficient and higher cooling efficiency. In addition, in the technical solutions of this application, the cooling oil flows in the cooling oil passages by using a driving force of the power apparatus 4, there is a comparatively even flow amount of cooling oil in each cooling oil passage, and thus a cooling effect is also better.

Figure 13:
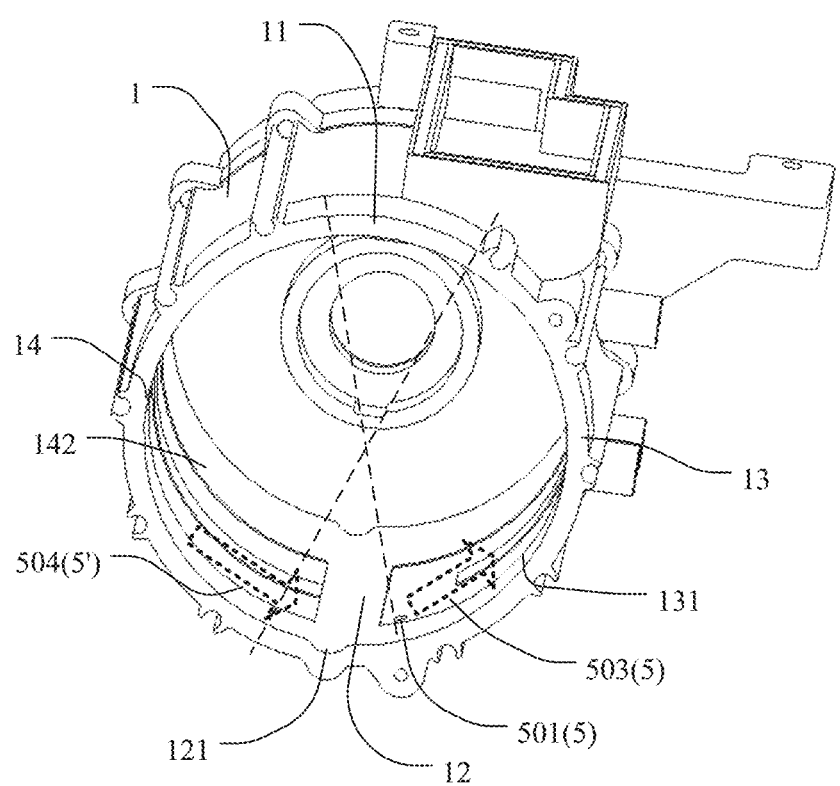
FIG. 13 is another schematic partial view of a cooling system according to an embodiment of this application.
Figure 14:
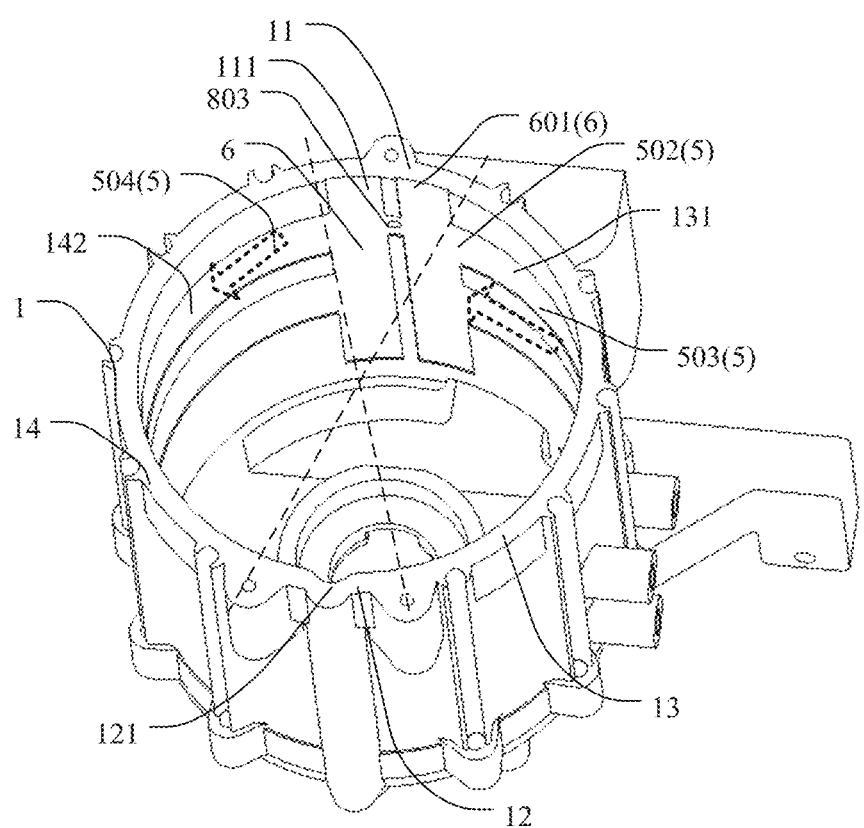
FIG. 14 is another schematic partial view of a cooling system according to an embodiment of this application.

Refer to FIG. 13 and FIG. 14. FIG. 13 is another schematic partial view of a cooling system according to an embodiment of this application. FIG. 14 is another schematic partial view of a cooling system according to an embodiment of this application. In another specific embodiment of this application, the inner wall of the fourth portion 14 of the housing includes a core oil return passage groove 142 that extends in the circumferential direction. An end that is of the core oil return passage groove 142 and that is close to the second portion 12 is connected to the oil return groove 121. An end that is of the core oil return passage groove 142 and that is close to the first portion 11 is connected to the coil cooling oil passage groove 111. After the stator core 2 is mounted in the housing 1, the core oil return passage groove 142 and the inner wall of the housing 1 fit together to form a core oil return passage 5'.

In this embodiment, the cooling system further includes the core oil return passage 5'. The core oil return passage 5' and the core cooling oil passage 5 are located on two sides of the oil return passage 7. To be specific, the core oil return passage 5' extends on one side of the stator core 2 in the circumferential direction, and the core cooling oil passage 5 extends on the other side of the stator core 2 in the circumferential direction. In other words, along a section perpendicular to the axial direction of the stator core 2, a line between a projection of the oil return passage 7 and a projection of the coil cooling oil passage 6 is located between a projection of the core oil return passage 5' and a projection of the core cooling oil passage 5. One end of the core oil return passage 5' is connected to the coil cooling oil passage 6, and the other end of the core oil return passage 5' is connected to the oil return passage 7. The cooling oil enters the core cooling oil passage 5 from the oil inlet 501, flows along the core cooling oil passage 5 to the coil cooling oil passage 6, and then flows to the core oil return passage 5'. The cooling oil that enters the core oil return passage 5' flows back to the oil return passage 7 for cycling. In this embodiment, only one oil inlet 501 may be disposed, which achieves a comparatively simple structure. In addition, all the cooling oil first enters the core cooling oil passage 5, and a part of the oil may enter the core oil return passage 5', so that there is a larger amount of cooling oil for cooling the stator core. Therefore, a cooling effect on the stator core can be improved.

As shown in FIG. 1, an embodiment of this application provides a motor cooling system of an electric vehicle, where the cooling system includes a housing 1, and a stator core 2 and a stator coil 3 are mounted in a barrel-shaped inner cavity of the housing 1. Specifically, the stator core 2 is a barrel-shaped stator core, and may be specifically a stator core in a round barrel shape. Usually, the stator core 2 includes a plurality of tooth portions extending in an axial direction of the stator core 2. The tooth portions are distributed at intervals in a circumferential direction of the stator core 2, a groove portion is formed between two adjacent tooth portions, and the stator coil 3 is disposed around the tooth portions. A commutating area of the stator coil 3, that is, an end portion 31 of the stator coil, protrudes from the stator core 2 in the axial direction. The motor cooling system of an electric vehicle in this embodiment differs from the foregoing motor cooling system of an electric vehicle in the following.

Still refer to FIG. 1, FIG. 2, and FIG. 3. The barrel-shaped stator core 2 is divided into four segments in the circumferential direction, which are separately a first segment 21, a third segment 23, a second segment 22, and a fourth segment 24 that are sequentially connected. The first segment 21 is opposite to the second segment 22, the third segment 23 is connected between a first end of the first segment 21 and a first end of the second segment 22, and the fourth segment 24 is connected between a second end of the first segment 21 and a second end of the second segment 22, so that the first segment 21, the third segment 23, the second segment 22, and the fourth segment 24 form the barrel-shaped stator core 2. An outer wall of the first segment 21 includes a coil cooling oil passage groove 211. The coil cooling oil passage groove 211 extends in the axial direction of the stator core 2 and passes through the stator core 2. The coil cooling oil passage groove 211 and an inner wall of the housing 1 fit together to form a coil cooling oil passage 6, so that cooling oil may flow out of two ends of the stator core 2 in the axial direction along the coil cooling oil passage 6, to cool an end portion area of the stator core 2 in the axial direction, for example, the end portion 31 of the stator coil located in the area. An outer wall of the second segment 22 includes an oil return groove 221. The oil return groove 221 extends in the axial direction of the stator core 2 and passes through the stator core 2. The oil return groove 221 and the inner wall of the housing 1 fit together to form an oil return passage 7, so that the cooling oil may flow out of the two ends of the stator core 2 in the axial direction along the oil return groove 221 to flow to an oil storage area, facilitating a next cycle. An outer wall of the third segment 23 includes a core cooling oil passage groove 231. The core cooling oil passage groove 231 extends in the circumferential direction of the stator core 2, and the core cooling oil passage groove 231 and the inner wall of the housing 1 fit together to form a core cooling oil passage 5. In this case, the cooling oil flows in the core cooling oil passage 5, and a circumferential side of the stator core 2 can be cooled, thereby cooling the stator core 2. There is an oil inlet area 2311 at an end that is of the core cooling oil passage groove 231 and that is close to the second segment 22, and there is an oil through port 502 at an end that is of the core cooling oil passage groove 231 and that is close to the first segment 21. The oil inlet area 2311 is opposite to an oil inlet 501 of the core cooling oil passage 5, the oil through port 502 is connected to the coil cooling oil passage groove 211, and therefore the core cooling oil passage groove 231 is connected to the coil cooling oil passage groove 211. The cooling oil may flow from the core cooling oil passage 5 to the coil cooling oil passage 6 through the oil through port 502, and the passages for the cooling oil can be connected in series. In this way, there are larger amounts of cooling oil for cooling both the stator core 2 and the end portion 31 of the stator coil. Therefore, the cooling system has a higher heat transfer coefficient and higher cooling efficiency. An outer wall of the fourth segment 24 also includes a core cooling oil passage groove 241. The core cooling oil passage groove 241 extends in the circumferential direction of the stator core 2. There is an oil inlet area 2411 at an end that is of the core cooling oil passage groove 241 and that is close to the second segment 22, and there is the oil through port 502 at an end that is of the core cooling oil passage groove 241 and that is close to the first segment 21. The oil inlet area 2411 is opposite to the oil inlet 501 of the core cooling oil passage 5, the oil through port 502 is connected to the coil cooling oil passage groove 211, and therefore the core cooling oil passage groove 241 is connected to the coil cooling oil passage groove 211. The cooling oil may flow from the core cooling oil passage 5 to the coil cooling oil passage 6 through the oil through port 502, and the passages for the cooling oil can be connected in series. Further, in a first direction, a distance between the oil inlet 501 and the oil return groove 221 is less than a distance between the oil through port 502 and the oil return groove 221, so that the cooling oil enters from the oil inlet 501 and flows upward along the core cooling oil passage 5 to cool the stator core 2, and then enters the coil cooling oil passage 6 from the oil through port 502, where the first direction is a gravity direction existing when the cooling system is in use.

Still refer to FIG. 1, FIG. 11, and FIG. 12. The housing 1 includes a first portion 11, a third portion 13, a second portion 12, and a fourth portion 14 that are sequentially connected in a circumferential direction of the barrel-shaped inner cavity. The first portion 11 is opposite to the second portion 12, the third portion 13 is connected between a first end of the first portion 11 and a first end of the second portion 12, and the fourth portion 14 is connected between a second end of the first portion 11 and a second end of the second portion 12, so that the first portion 11, the third portion 13, the second portion 12, and the fourth portion 14 form the housing 1 that includes the barrel-shaped inner cavity. An inner wall of the first portion 11 includes a coil cooling oil passage groove 111. The coil cooling oil passage groove 111 extends in an axial direction of the barrel-shaped inner cavity of the housing, and the coil cooling oil passage groove 111 and an outer wall of the stator core 2 fit together to form the coil cooling oil passage 6. Two ends of the coil cooling oil passage 6 protrude from the two ends of the stator core 2 in the axial direction, so that the cooling oil may flow out of the two ends of the stator core 2 in the axial direction along the coil cooling oil passage 6, to cool the end portion area of the stator core 2 in the axial direction, for example, the end portion 31 of the stator coil located in the area. An inner wall of the second portion 12 includes an oil return groove 121. The oil return groove 121 extends in the axial direction of the barrel-shaped inner cavity of the housing, and the oil return groove 121 and the inner wall of the housing fit together to form the oil return passage, so that the cooling oil may flow to the oil storage area along the oil return groove 121, facilitating a next cycle. An inner wall of the third portion 13 includes a core cooling oil passage groove 131. The core cooling oil passage groove 131 extends in the circumferential direction of the barrel-shaped inner cavity of the housing 1, and the core cooling oil passage groove 131 and the inner wall of the housing 1 fit together to form the core cooling oil passage 5. The core cooling oil passage 5 is located on the circumferential side of the stator core 2, and the cooling oil flows in the core cooling oil passage 5, so that the circumferential side of the stator core 2 can be cooled, thereby cooling the stator core 2. There is the oil inlet at an end that is of the core cooling oil passage groove 131 and that is close to the second portion 12, and there is the oil through port 502 at an end that is of the core cooling oil passage groove 131 and that is close to the first portion 11. The oil through port 502 is connected to the coil cooling oil passage groove 111, and therefore the core cooling oil passage groove 131 is connected to the coil cooling oil passage groove 111. The cooling oil may flow from the core cooling oil passage 5 to the coil cooling oil passage 6 through the oil through port 502, and the passages for the cooling oil can be connected in series. In this way, there are larger amounts of cooling oil for cooling both the stator core 2 and the end portion 31 of the stator coil. Therefore, the cooling system has a higher heat transfer coefficient and higher cooling efficiency. An inner wall of the fourth portion 14 also includes a core cooling oil passage groove 141. The core cooling oil passage groove 141 extends in the circumferential direction of the barrel-shaped inner cavity of the housing 1, and the core cooling oil passage groove 141 and the inner wall of the housing 1 fit together to form the core cooling oil passage 5. The core cooling oil passage 5 is located on the circumferential side of the stator core 2. There is the oil inlet at an end that is of the core cooling oil passage groove 141 and that is close to the second portion 12, and there is the oil through port 502 at an end that is of the core cooling oil passage groove 141 and that is close to the first portion 11. The oil through port 502 is connected to the coil cooling oil passage groove 111, and therefore the core cooling oil passage groove 141 is connected to the coil cooling oil passage groove 111. The cooling oil may flow from the core cooling oil passage 5 to the coil cooling oil passage 6 through the oil through port, and the passages for the cooling oil can be connected in series. Further, in the first direction, a distance between the oil inlet 501 and the oil return groove 121 is less than a distance between the oil through port 502 and the oil return groove 121, so that the cooling oil enters from the oil inlet 501 and flows upward along the core cooling oil passage 5 to cool the stator core 2, and then enters the coil cooling oil passage 6 from the oil through port 502, where the first direction is the gravity direction existing when the cooling system is in use.

Refer to FIG. 13 and FIG. 14. In another specific embodiment of this application, the inner wall of the fourth portion 14 of the housing 1 includes a core oil return passage groove 142 that extends in the circumferential direction. An end that is of the core oil return passage groove 142 and that is close to the second portion 12 is connected to the oil return groove 121. An end that is of the core oil return passage groove 142 and that is close to the first portion 11 is connected to the coil cooling oil passage groove 111. The outer wall of the fourth segment 24 of the stator core 2 includes a core oil return passage groove 242 that extends in the circumferential direction. An end that is of the core oil return passage groove 242 and that is close to the second segment 22 is connected to the oil return groove 221. An end that is of the core oil return passage groove 142 and that is close to the first segment 11 is connected to the coil cooling oil passage groove 211. After the stator core 2 is mounted in the housing 1, a core oil return passage 5' is formed.

In this embodiment, the cooling system further includes the core oil return passage 5'. The core oil return passage 5' and the core cooling oil passage 5 are located on two sides of the oil return passage 7. To be specific, the core oil return passage 5' extends on one side of the stator core 2 in the circumferential direction, and the core cooling oil passage 5 extends on the other side of the stator core 2 in the circumferential direction. In other words, along a section perpendicular to the axial direction of the stator core 2, a line between a projection of the oil return passage 7 and a projection of the coil cooling oil passage 6 is located between a projection of the core oil return passage 5' and a projection of the core cooling oil passage 5. One end of the core oil return passage 5' is connected to the coil cooling oil passage 6, and the other end of the core oil return passage 5' is connected to the oil return passage 7. The cooling oil enters the core cooling oil passage 5 from the oil inlet 501, flows along the core cooling oil passage 5 to the coil cooling oil passage 6, and then flows to the core oil return passage 5'. The cooling oil that enters the core oil return passage 5' flows back to the oil return passage 7 for cycling. In this embodiment, only one oil inlet 501 may be disposed, which achieves a comparatively simple structure. In addition, all the cooling oil first enters the core cooling oil passage 5, and a part of the oil may enter the core oil return passage 5', so that there is a larger amount of cooling oil for cooling the stator core. Therefore, a cooling effect on the stator core can be improved.

It should be noted that, in this embodiment, the core cooling oil passage groove on an inner surface of the housing may be completely opposite or partially opposite to the core cooling oil passage groove on an outer surface of the stator core, or they may be completely staggered. The coil cooling oil passage groove on the inner surface of the housing may be completely opposite or partially opposite to the coil cooling oil passage groove on the outer surface of the stator core, or they may be completely staggered. The oil return groove on the inner surface of the housing may be completely opposite or partially opposite to the oil return groove on the outer surface of the stator core, or they may be completely staggered. The core oil return passage groove on the inner surface of the housing may be completely opposite or partially opposite to the core oil return passage groove on the outer surface of the stator core, or they may be completely staggered. In this embodiment of this application, both the inner surface of the housing and the outer surface of the stator core include grooves, which helps increase a flow amount of each oil passage and improve a cooling effect of the cooling system.

This application provides an electric vehicle. The electric vehicle includes the motor cooling system in any one of the foregoing technical solutions. The electric vehicle includes a motor and a battery. The battery is electrically connected to the motor to drive the motor to run. When the motor runs, the electric vehicle can be driven to run. The stator core in the foregoing motor cooling system belongs to the motor of the electric vehicle, and cooling of the stator core performed by the motor cooling system is cooling of the motor of the electric vehicle. Therefore, a better cooling effect on the motor of the electric vehicle is achieved, which helps improve operation efficiency of the motor and prolong service life of the motor, and thus helps improve operation efficiency of the electric vehicle and prolong service life of the electric vehicle.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A stator core having a barrel shape and comprising:
   a first segment, a second segment, a third segment, and a fourth segment sequentially connected in a circumferential direction of the stator core, wherein the first segment is opposite to the third segment;
   a coil cooling oil passage groove extending in an axial direction of the stator core, passing through the stator core, and disposed on an outer wall of the first segment;
   an oil return groove extending in the axial direction of the stator core, passing through the stator core, and disposed on an outer wall of the third segment;
   a first core cooling oil passage groove extending in the circumferential direction of the stator core and disposed on an outer wall of the second segment, wherein an oil inlet area is disposed at an end of the first core cooling oil passage groove of the second segment and close to the third segment, and the oil inlet area is opposite to an oil inlet;
   another end of the first core cooling oil passage groove of the second segment is close to the first segment and connected to the coil cooling oil passage groove through an oil through port;
   wherein in a first direction, a distance between the oil inlet area and the oil return groove is less than a distance between the oil through port and the oil return groove, wherein the first direction is a gravity direction existing when the stator core is in use; and either
   a second core cooling oil passage groove extending in the circumferential direction of the stator core and disposed on an outer wall of the fourth segment, wherein an oil inlet area is disposed at an end of the second core cooling oil passage groove of the fourth segment and close to the third segment, and the oil inlet area is opposite to the oil inlet,
   another end of the second core cooling oil passage groove of the fourth segment is disposed close to the first segment and is connected to the coil cooling oil passage groove through the oil through port,
   and in the first direction, a distance between the oil inlet and the oil return groove is less than a distance between the oil through port and the oil return groove;
   or a core oil return passage groove extending in the circumferential direction of the stator core and disposed on the outer wall of the fourth segment, wherein an end of the core oil return passage groove close to the third segment is connected to the oil return groove, and another end of the core oil return passage groove close to the first segment is connected to the coil cooling oil passage groove.

2. The stator core according to claim 1, wherein along a section that passes through the oil inlet area and that is perpendicular to the axial direction of the stator core, a circumferential distance $L_1$ between an axis of the oil return groove and the oil inlet area is less than or equal to one eighth of an outer circumference L of the stator core.

3. The stator core according to claim 1, wherein along a section that passes through the oil through port and that is perpendicular to the axial direction of the stator core, a circumferential distance $L_2$ between the axis of the oil return groove and the oil through port is greater than or equal to three eighth of an outer circumference L of the stator core.

4. The stator core according to claim 1, wherein along a section perpendicular to the axial direction of the stator core, a total circumferential length L3 of projections of the core cooling oil passage grooves is greater than or equal to nine tenth of an outer circumference L of the stator core.

5. The stator core according to claim 1, wherein along a section perpendicular to the axial direction of the stator core, an axis of the coil cooling oil passage groove is located at a highest position of the stator core in the first direction.

6. A housing for mounting a stator core, the housing comprising:
   a barrel-shaped inner cavity, wherein the stator core is mountable in the barrel-shaped inner cavity of the housing;
   a first portion, a second portion, a third portion, and a fourth portion sequentially connected in a circumferential direction of the barrel-shaped inner cavity, wherein the first portion is opposite to the third portion;
   a coil cooling oil passage groove extending in an axial direction of the barrel-shaped inner cavity and disposed on an inner wall of the first portion;
   an oil return groove extending in the axial direction of the barrel-shaped inner cavity and is-disposed on an inner wall of the third portion;

a first core cooling oil passage groove extending in the circumferential direction of the barrel-shaped inner cavity and disposed on an inner wall of the second portion, wherein an oil inlet is disposed at an end of the first core cooling oil passage groove of the second portion and close to the third portion;

another end of the first core cooling oil passage groove of the second portion is close to the first portion and connected to the coil cooling oil passage groove through an oil through port;

wherein in a first direction, a distance between the oil inlet and the oil return groove is less than a distance between the oil through port and the oil return groove, wherein the first direction is a gravity direction existing when the housing is in use; and either a second core cooling oil passage groove extending in the circumferential direction of the barrel-shaped inner cavity and disposed on an inner wall of the fourth portion, wherein the oil inlet is disposed at an end of the second core cooling oil passage groove of the fourth portion and close to the third portion, another end of the second core cooling oil passage groove of the fourth portion is disposed close to the first portion and is connected to the coil cooling oil passage groove through the oil through port, and in the first direction, a distance between the oil inlet and the oil return groove is less than a distance between the oil through port and the oil return groove;

or a core oil return passage groove extending in the circumferential direction of the barrel-shaped inner cavity disposed on the inner wall of the fourth portion, wherein an end of the core oil return passage groove close to the third portion is connected to the oil return groove, and another end of the core oil return passage groove close to the first portion is connected to the coil cooling oil passage groove.

7. The housing according to claim 6, further comprising the stator core interference-fitted into the barrel-shaped inner cavity of the housing.

8. The housing according to claim 6, wherein along a section that passes through the oil inlet and that is perpendicular to the axial direction of the barrel-shaped inner cavity, a circumferential distance $L_1$ between an axis of the oil return groove and the oil inlet is less than or equal to one eighth of an inner circumference L of the barrel-shaped inner cavity.

9. The housing according to claim 6, wherein along a section that passes through the oil through port and that is perpendicular to the axial direction of the barrel-shaped inner cavity, a circumferential distance L2 between the axis of the oil return groove and the oil through port is greater than or equal to three eighth of an inner circumference L of the barrel-shaped inner cavity.

10. The housing according to claim 6, wherein along a section perpendicular to the axial direction of the barrel-shaped inner cavity, a total circumferential length L3 of projections of the core cooling oil passage grooves is greater than or equal to nine tenth of an inner circumference L of the barrel-shaped inner cavity.

11. The housing according to claim 6, wherein along a section perpendicular to the axial direction of the barrel-shaped inner cavity, an axis of the coil cooling oil passage groove is located at a highest position of the barrel-shaped inner cavity in the first direction.

12. A motor cooling system for an electric vehicle, comprising:

a stator core, a housing, and a stator coil protruding from the stator core in an axial direction of the stator core, wherein the stator core is mounted in the housing, an inner wall of the stator core comprises a plurality of tooth portions extending in the axial direction of the stator core, the tooth portions being distributed at intervals, wherein the stator coil is disposed around the tooth portions;

wherein the stator core has a barrel shape, and the stator core comprises a first segment, a second segment, a third segment, and a fourth segment that are sequentially connected in a circumferential direction, wherein the first segment is opposite to the third segment;

a coil cooling oil passage groove extending in the axial direction of the stator core, passing through the stator core, and disposed on an outer wall of the first segment;

an oil return groove extending in the axial direction of the stator core, passing through the stator core, and disposed on an outer wall of the third segment;

a first core cooling oil passage groove extending in the circumferential direction of the stator core and disposed on an outer wall of the second segment, wherein an oil inlet area is disposed at an end of the first core cooling oil passage groove of the second segment and close to the third segment, and the oil inlet area is opposite to an oil inlet;

another end of the first core cooling oil passage groove of the second segment is close to the first segment and connected to the coil cooling oil passage groove through an oil through port;

wherein in a first direction, a distance between the oil inlet area and the oil return groove is less than a distance between the oil through port and the oil return groove, wherein the first direction is a gravity direction existing when the stator core is in use; and either a second core cooling oil passage groove extending in the circumferential direction of the stator core and disposed on an outer wall of the fourth segment, wherein an oil inlet area is disposed at an end of the second core cooling oil passage groove of the fourth segment and close to the third segment, and the oil inlet area is opposite to the oil inlet, another end of the second core cooling oil passage groove of the fourth segment is disposed close to the first segment and is connected to the coil cooling oil passage groove through the oil through port, and in the first direction, a distance between the oil inlet and the oil return groove is less than a distance between the oil through port and the oil return groove;

or a core oil return passage groove extending in the circumferential direction of the stator core and disposed on the outer wall of the fourth segment, wherein an end of the core oil return passage groove close to the third segment is connected to the oil return groove, and another end of the core oil return passage groove close to the first segment is connected to the coil cooling oil passage groove.

13. The motor cooling system for the electric vehicle according to claim 12, further comprising a reducer main body, wherein a reducer oil passage is disposed in the reducer main body, the reducer oil passage is connected to the core cooling oil passage grooves, or the reducer oil passage is connected to the coil cooling oil passage groove, and the reducer oil passage comprises an oil outlet that is configured to spray cooling oil to one operation area of a rotating member of the reducer main body.

14. The motor cooling system for the electric vehicle according to claim 13, wherein a plurality of operation areas, each corresponding to a rotating member, include the one operation area, and wherein the reducer oil passage comprises a bending portion, the bending portion comprising a plurality of oil outlets, and the operation area of each rotating member corresponds to at least one of the oil outlets.

15. The motor cooling system for the electric vehicle according to claim 12, wherein along the section perpendicular to the axial direction of the stator core, an axis of the coil cooling oil passage groove is located at a highest position of the stator core in the first direction.

16. A motor cooling system for an electric vehicle, comprising:
- a housing, a stator core, and a stator coil, wherein the stator core is mounted in the housing, wherein an inner wall of the stator core comprises a plurality of tooth portions extending in an axial direction of the stator core, the tooth portions are distributed at intervals, the stator coil is disposed around the tooth portions, and the stator coil protrudes from the stator core in the axial direction of the stator core;
- wherein the stator core is mounted in a barrel-shaped inner cavity of the housing, and the housing comprises a first portion, a second portion, a third portion, and a fourth portion that are sequentially connected in a circumferential direction of the barrel-shaped inner cavity, wherein the first portion is opposite to the third portion;
- a coil cooling oil passage groove extending in an axial direction of the barrel-shaped inner cavity and disposed on an inner wall of the first portion;
- an oil return groove extending in the axial direction of the barrel-shaped inner cavity and disposed on an inner wall of the third portion;
- a first core cooling oil passage groove extending in the circumferential direction of the barrel-shaped inner cavity and disposed on an inner wall of the second portion, wherein an oil inlet is disposed at an end of the first core cooling oil passage groove of the second portion and close to the third portion;
- another end of the first core cooling oil passage groove of the second portion is disposed close to the first portion and is connected to the coil cooling oil passage groove through an oil through port;
- and in a first direction, a distance between the oil inlet and the oil return groove is less than a distance between the oil through port and the oil return groove, wherein the first direction is a gravity direction existing when the housing is in use; and either
- a second core cooling oil passage groove extending in the circumferential direction of the barrel-shaped inner cavity and disposed on an inner wall of the fourth portion, wherein the oil inlet is disposed at an end of the second core cooling oil passage groove of the fourth portion and close to the third portion,
- another end of the second core cooling oil passage groove of the fourth portion is disposed close to the first portion and is connected to the coil cooling oil passage groove through the oil through port,
- and in the first direction, a distance between the oil inlet and the oil return groove is less than a distance between the oil through port and the oil return groove;
- or a core oil return passage groove extending in the circumferential direction of the barrel-shaped inner cavity and disposed on the inner wall of the fourth portion, an end of the core oil return passage groove close to the third portion is connected to the oil return groove, and another end of the core oil return passage groove close to the first portion is connected to the coil cooling oil passage groove.

17. The motor cooling system for the electric vehicle according to claim 16, further comprising a reducer main body, wherein a reducer oil passage is disposed in the reducer main body, the reducer oil passage is connected to the core cooling oil passage grooves, or the reducer oil passage is connected to the coil cooling oil passage groove, and the reducer oil passage comprises an oil outlet that is configured to spray cooling oil to one operation area of a rotating member of the reducer main body.

18. The motor cooling system for the electric vehicle according to claim 17, wherein a plurality of operation areas, each corresponding to a rotating member, include the one operation area, and wherein the reducer oil passage comprises a bending portion, the bending portion comprising a plurality of oil outlets, and the operation area of each rotating member corresponds to at least one of the oil outlets.

19. The motor cooling system for the electric vehicle according to claim 16, wherein along the section perpendicular to the axial direction of the barrel-shaped inner cavity, an axis of the coil cooling oil passage groove is located at a highest position of the barrel-shaped inner cavity in the first direction.

* * * * *

UNITED STATES PATENT AND TRADEMARK OFFICE
CERTIFICATE OF CORRECTION

PATENT NO. : 11,581,785 B2
APPLICATION NO. : 17/481526
DATED : February 14, 2023
INVENTOR(S) : Jiangang Wang et al.

It is certified that error appears in the above-identified patent and that said Letters Patent is hereby corrected as shown below:

In the Claims

In Column 28, Line 46, in Claim 4, delete "L3" and insert -- $L_3$ --.

In Column 28, Line 66, in Claim 6, delete "is-disposed" and insert -- disposed --.

In Column 29, Line 51, in Claim 9, delete "L2" and insert -- $L_2$ --.

In Column 29, Line 57, in Claim 10, delete "L3" and insert -- $L_3$ --.

Signed and Sealed this
Eleventh Day of April, 2023

Katherine Kelly Vidal
*Director of the United States Patent and Trademark Office*